United States Patent
Watanabe

(10) Patent No.: US 9,921,537 B2
(45) Date of Patent: Mar. 20, 2018

(54) DRIVE MECHANISM THAT CHANGES SPEED OF DRIVE FORCE, AND IMAGE FORMING APPARATUS HAVING THE DRIVE MECHANISM

(71) Applicant: Brother Kogyo Kabushiki Kaisha, Nagoya-shi, Aichi-ken (JP)

(72) Inventor: Tomonori Watanabe, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/447,330

(22) Filed: Mar. 2, 2017

(65) Prior Publication Data
US 2017/0269536 A1    Sep. 21, 2017

(30) Foreign Application Priority Data
Mar. 16, 2016   (JP) ................. 2016-052809

(51) Int. Cl.
G03G 15/00   (2006.01)
G03G 15/08   (2006.01)
F16H 3/54    (2006.01)

(52) U.S. Cl.
CPC .......... *G03G 15/757* (2013.01); *F16H 3/54* (2013.01); *F16H 2200/0034* (2013.01); *F16H 2200/2005* (2013.01)

(58) Field of Classification Search
CPC ............ G03G 15/757; G03G 15/0806; G03G 15/0813
USPC ................................. 399/167, 279
See application file for complete search history.

(56) References Cited

U.S. PATENT DOCUMENTS

| | | | | |
|---|---|---|---|---|
| 9,182,725 | B2 * | 11/2015 | Hayakawa | G03G 15/757 |
| 9,501,020 | B2 * | 11/2016 | Yamaguchi | G03G 15/6529 |
| 2015/0153690 | A1 | 6/2015 | Suzuki | |

FOREIGN PATENT DOCUMENTS

| | | |
|---|---|---|
| JP | 2008-033215 A | 2/2008 |
| JP | 2008-101644 A | 5/2008 |
| JP | 2011-169375 A | 9/2011 |
| JP | 2015-106055 A | 6/2015 |

* cited by examiner

Primary Examiner — William J Royer
(74) Attorney, Agent, or Firm — Banner & Witcoff, Ltd.

(57) ABSTRACT

In a drive mechanism, a two-stage gear has an input gear and a sun gear. A planetary gear is engaged with both of outer teeth of the sun gear and inner teeth of a ring gear. A carrier, which is capable of rotating together with a rotational shaft, supports the planetary gear, and outputs drive force. A drive force transmission switching member switches between a connecting state connecting the two-stage gear and the carrier such that they rotate together via the rotational shaft, and a separating state separating the two-stage gear and carrier such that they rotate relative to each other. A one-way clutch allows the ring gear to rotate in one of a pair of opposite directions about the central axis of the rotational shaft, and prohibits the ring gear from rotating in the other one of the pair of opposite directions.

6 Claims, 9 Drawing Sheets

DRIVE MECHANISM THAT CHANGES SPEED OF DRIVE FORCE, AND IMAGE FORMING APPARATUS HAVING THE DRIVE MECHANISM

CROSS REFERENCE TO RELATED APPLICATION

This application claims priority from Japanese Patent Application No. 2016-052809 filed Mar. 16, 2016. The entire content of the priority application is incorporated herein by reference.

TECHNICAL FIELD

The present invention relates to a drive mechanism capable of changing a speed of a drive force, and to an image forming apparatus provided with such drive mechanism.

BACKGROUND

In a conventional electro-photographic type image forming apparatus, a developing roller is provided for supplying toner to a surface of a photosensitive drum where an electrostatic latent image is formed. Here, rotational speed of a developing roller can be changed between a higher speed at which toner supply to the photosensitive drum is carried out for performing developing operation and a lower speed at which the developing operation is not performed in order to prolong service life of the developing roller.

More specifically, a drive mechanism capable of changing a speed of a drive force is provided between a motor that generates drive force and the developing roller. The drive mechanism is adapted to supply decelerated drive force to the developing roller when the developing roller does not perform developing operation.

Japanese Patent Application Publication No. 2008-101644 discloses such drive mechanism capable of changing a speed of a drive force. The drive mechanism includes a speed-change mechanism in which two pairs of gears having a distance between shafts of gears equal to each other are provided. Further, deceleration ratio of the first pair of gears is different from that of the second pair of gears. The speed-change mechanism is adapted for arranging the two pairs of gears such that when the first pair of gears are meshedly engaged with each other, the second pair of gears are disengaged from each other. The drive mechanism also includes a change-over mechanism adapted to change a combination of gears to be engaged with each other by moving the speed-change mechanism in an axial direction.

SUMMARY

According to the drive mechanism disclosed in the Japanese Publication, in order to change a speed of the drive force, a combination of gears that is engaged with each other is changed by moving the speed-change mechanism in the axial direction. Therefore, a bulky space is required for changing the speed of the drive force, so that a resultant drive mechanism becomes bulky. Further, service life of the gears may be reduced because the meshed states of the gears are changed, that is, gears that have been in meshed engagement are brought out of engagement and gears that have been out of meshed engagement are brought into engagement.

Therefore, it is an object of the disclosure to provide a drive mechanism and an image forming apparatus provided with such drive mechanism capable of prolonging service life thereof with a compact structure.

According to one aspect, a drive mechanism includes: a rotational shaft; a two-stage gear; a ring gear; a planetary gear; a carrier; a drive force transmission switching member; and a one-way clutch. The rotational shaft is configured to rotate about a central axis thereof. The two-stage gear is disposed on the rotational shaft so as to be rotatable about the central axis of the rotational shaft. The two-stage gear has an input gear configured to be engaged with a drive gear to receive a drive force from the drive gear. The two-stage gear further has a sun gear having outer teeth formed on an outer circumferential surface thereof. The ring gear is disposed on the rotational shaft so as to be rotatable relative to the two-stage gear about the central axis of the rotational shaft. The ring gear has inner teeth formed on an inner circumferential surface thereof. The planetary gear is disposed between the sun gear of the two-stage gear and the inner teeth of the ring gear and engaged with both of the outer teeth of the sun gear and the inner teeth of the ring gear. The planetary gear has its own rotational axis. The carrier is disposed on the rotational shaft so as to be capable of rotating together with the rotational shaft about the central axis of the rotational shaft. The carrier is capable of rotating relative to the two-stage gear and the ring gear. The carrier supports the planetary gear in a state that the planetary gear is capable of rotating about its own rotational axis and movable along a prescribed orbit about the central axis of the rotational shaft. The carrier is configured to output a drive force. The drive force transmission switching member is disposed coaxially with the rotational shaft and configured to switch between a connecting state connecting the two-stage gear and the carrier such that the two-stage gear and the carrier rotate together via the rotational shaft, and a separating state separating the two-stage gear and carrier such that the two-stage gear and the carrier rotate relative to each other. The one-way clutch is disposed coaxially with the rotational shaft and configured to allow the ring gear to rotate in one of a pair of opposite directions about the central axis of the rotational shaft and prohibit the ring gear from rotating in the other one of the pair of opposite directions about the central axis of the rotational shaft.

According to another aspect, a drive mechanism includes: a rotational shaft; a first input gear; a two-stage gear; a ring gear; a planetary gear; a carrier; a drive force transmission switching member; and a one-way clutch. The rotational shaft is configured to rotate about a central axis thereof. The first input gear is disposed on the rotational shaft so as to be rotatable about the central axis of the rotational shaft and configured to be engaged with a drive gear to receive a drive force from the drive gear. Each of the drive gear and the first input gear is a helical gear. The two-stage gear is disposed on the rotational shaft so as to be rotatable about the central axis of the rotational shaft. The two-stage gear has a second input gear. The second input gear is a helical gear configured to be engaged with the drive gear to receive a drive force from the drive gear. The two-stage gear further has a sun gear having outer teeth formed on an outer circumferential surface thereof. The ring gear is disposed on the rotational shaft so as to be rotatable relative to the two-stage gear about the central axis of the rotational shaft. The ring gear has inner teeth formed on an inner circumferential surface thereof. The planetary gear is disposed between the sun gear of the two-stage gear and the inner teeth of the ring gear and engaged with both of the outer teeth of the sun gear and the inner teeth of the ring gear. The planetary gear has its own rotational axis. The carrier is disposed on the rotational shaft so as to be capable of rotating together with the rotational shaft about the central axis of the rotational shaft. The carrier is capable of rotating relative to the two-stage gear and the ring gear. The carrier supports the planetary gear in a state that the planetary gear is capable of rotating about its own rotational axis and movable along a prescribed orbit about the central axis of the rotational shaft. The carrier is configured to output a drive force. The drive force transmission switching member is disposed coaxially with the rotational shaft, and configured to be switchable between a connecting state connecting the first input gear and the carrier such that the first input gear and the carrier rotate together via the rotational shaft, and a separating state separating the first input gear and the carrier such that the first input gear and the carrier can rotate relative to each other. The one-way clutch is disposed coaxially with the rotational shaft and configured to allow the ring gear to rotate in one of a pair of opposite directions about the central axis of the rotational shaft and prohibit the ring gear from rotating in the other one of the pair of opposite directions about the central axis of the rotational shaft.

According to another aspect, an image forming apparatus includes: an image forming section; a drive force source; a drive gear; and a drive mechanism. The image forming section includes a developing roller configured to rotate upon receipt of a drive force and supply toner to a surface of a photosensitive drum, thereby developing an electrostatic latent image formed on the surface of the photosensitive drum into a toner image. The drive force source is configured to output a drive force. The drive gear is configured to receive the drive force from the drive force source and to output the drive force. The drive mechanism is configured to receive the drive force from the drive gear and to output the drive force to the developing roller. The drive mechanism includes: a rotational shaft; a two-stage gear; a ring gear; a planetary gear; a carrier; a drive force transmission switching member; and a one-way clutch. The rotational shaft is configured to rotate about a central axis thereof. The two-stage gear is disposed on the rotational shaft so as to be rotatable about the central axis of the rotational shaft. The two-stage gear has an input gear engaged with the drive gear to receive the drive force from the drive gear. The two-stage gear further has a sun gear having outer teeth formed on an outer circumferential surface thereof. The ring gear is disposed on the rotational shaft so as to be rotatable relative to the two-stage gear about the central axis of the rotational shaft. The ring gear has inner teeth formed on an inner circumferential surface thereof. The planetary gear is disposed between the sun gear of the two-stage gear and the inner teeth of the ring gear and engaged with both of the outer teeth of the sun gear and the inner teeth of the ring gear. The planetary gear has its own rotational axis. The carrier is disposed on the rotational shaft so as to be capable of rotating together with the rotational shaft about the central axis of the rotational shaft. The carrier is capable of rotating relative to the two-stage gear and the ring gear. The carrier supports the planetary gear in a state that the planetary gear is capable of rotating about its own rotational axis and movable along a prescribed orbit about the central axis of the rotational shaft. The carrier is configured to output the drive force to the developing roller. The drive force transmission switching member is disposed coaxially with the rotational shaft and configured to switch between a connecting state connecting the two-stage gear and the carrier such that the two-stage gear and the carrier rotate together via the rotational shaft, and a separating state separating the two-stage gear and carrier such that the two-stage gear and the carrier rotate relative to each other. The one-way clutch is disposed coaxially with the rotational shaft and configured to allow the ring gear to rotate in one of a pair of opposite directions about the central axis of the rotational shaft and prohibit the ring gear from rotating in the other one of the pair of opposite directions about the central axis of the rotational shaft.

According to another aspect, an image forming apparatus includes: an image forming section; a drive gear; and a drive mechanism. The image forming section includes a developing roller configured to rotate upon receipt of a drive force and supply toner to a surface of a photosensitive drum, thereby developing an electrostatic latent image formed on the surface of the photosensitive drum into a toner image. The drive force source is configured to output a drive force. The drive gear is configured to receive the drive force from the drive force source and to output the drive force. The drive mechanism is configured to receive the drive force from the drive gear and to output the drive force to the developing roller. The drive mechanism includes: a rotational shaft; a first input gear; a two-stage gear; a ring gear; a planetary gear; a carrier; a drive force transmission switching member; and a one-way clutch. The rotational shaft is configured to rotate about a central axis thereof. The first input gear is disposed on the rotational shaft so as to be rotatable about the central axis of the rotational shaft and engaged with the drive gear to receive the drive force from the drive gear. Each of the drive gear and the first input gear is a helical gear. The two-stage gear is disposed on the rotational shaft so as to be rotatable about the central axis of the rotational shaft. The two-stage gear has a second input gear configured of a helical gear that is engaged with the drive gear to receive the drive force from the drive gear. The two-stage gear further has a sun gear having outer teeth formed on an outer circumferential surface thereof. The ring gear is disposed on the rotational shaft so as to be rotatable relative to the two-stage gear about the central axis of the rotational shaft. The ring gear has inner teeth formed on an inner circumferential surface thereof. The planetary gear is disposed between the sun gear of the two-stage gear and the inner teeth of the ring gear and engaged with both of the outer teeth of the sun gear and the inner teeth of the ring gear. The planetary gear has its own rotational axis. The carrier is disposed on the rotational shaft so as to be capable of rotating together with the rotational shaft about the central axis of the rotational shaft, the carrier being capable of rotating relative to the two-stage gear and the ring gear. The carrier supports the planetary gear in a state that the planetary gear is capable of rotating about its own rotational axis and movable along a prescribed orbit about the central axis of the rotational shaft. The carrier is configured to output the drive force to the developing roller. The drive force transmission switching member is disposed coaxially with the rotational shaft, and configured to be switchable between a connecting state connecting the first input gear and the carrier such that the first input gear and the carrier rotate together via the rotational shaft, and a separating state separating the first input gear and the carrier such that the first input gear and the carrier can rotate relative to each other. The one-way clutch is disposed coaxially with the rotational shaft and configured to allow the ring gear to rotate in one of a pair of opposite directions about the central axis of the rotational shaft and prohibit the ring gear from rotating in the other one of the pair of opposite directions about the central axis of the rotational shaft.

BRIEF DESCRIPTION OF THE DRAWINGS

The particular features and advantages of the disclosure will become apparent from the following description taken in connection with the accompanying drawings, in which.

DETAILED DESCRIPTION

An image forming apparatus 1 provided with a drive mechanism 20 according to a first embodiment will be described with reference to FIGS. 1 through 6.

The terms "upward", "downward", "upper", "lower", "above", "below", "beneath", "right", "left", "front", "rear" and the like will be used throughout the description assuming that the image forming apparatus 1 is disposed in an orientation in which it is intended to be used. In use, the image forming apparatus 1 is disposed as shown in FIG. 1.

[Overall Structure of Image Forming Apparatus]

Figure 1:
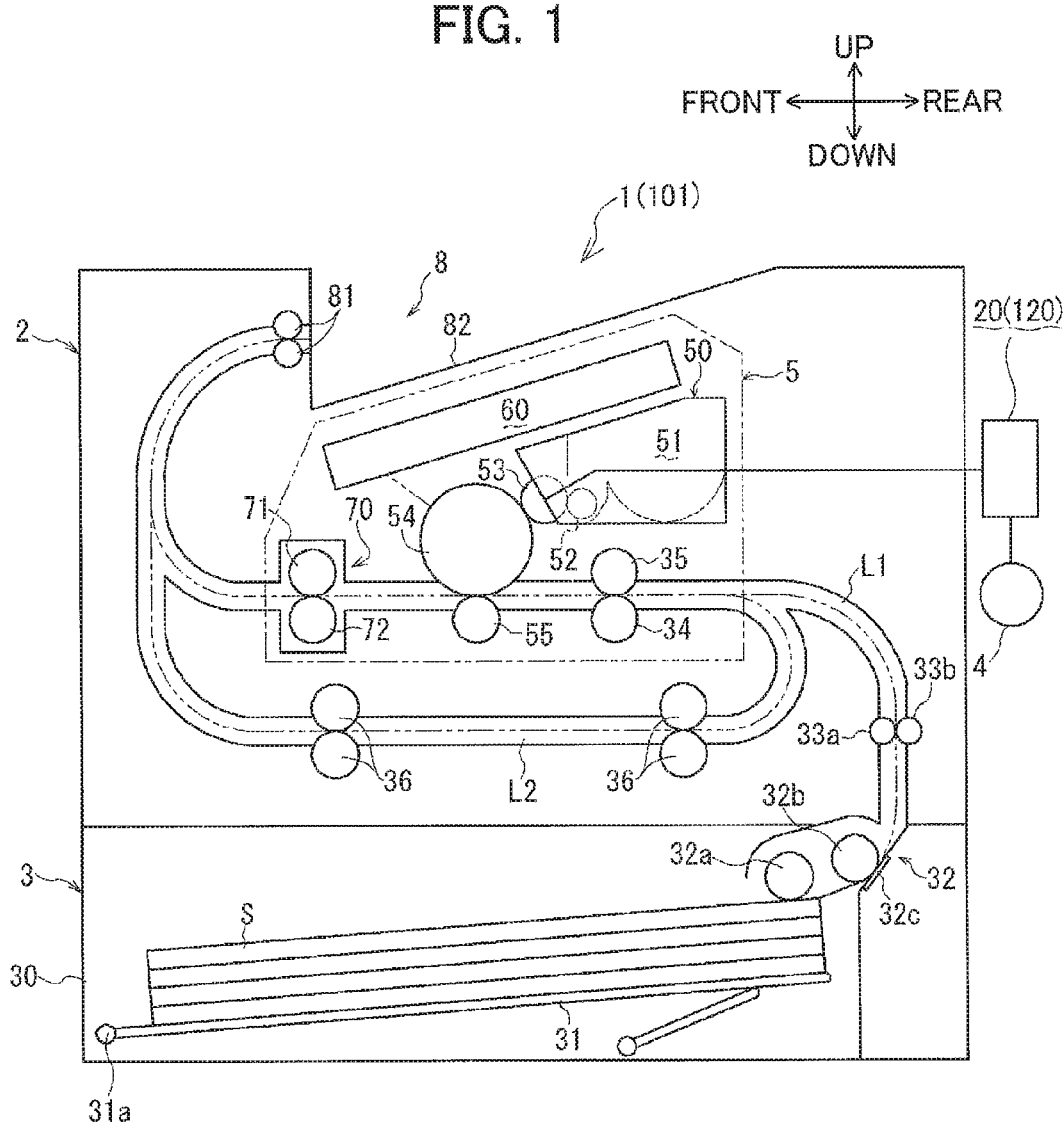
FIG. 1 is a schematic cross-sectional side view of an image forming apparatus provided with a drive mechanism according to a first embodiment.

As illustrated in FIG. 1, the image forming apparatus 1 includes a main housing 2, a sheet supply unit 3, an image-forming unit 5 including a developing roller 53, a discharge unit 8, a motor 4 as a drive source for supplying a drive force, and a drive mechanism 20 for transmitting the drive force from the motor 4 to rotationally drive the developing roller 53. Although the motor 4 and drive mechanism 20 are provided inside the main housing 2, the motor 4 and drive mechanism 20 are depicted as being outside the main housing 2 in FIG. 1.

The sheet supply unit 3 is positioned in a lower portion of the main housing 2, and is adapted to convey sheets S placed in the sheet supply unit 3 to the image-forming unit 5. The image-forming unit 5 is positioned downstream of the sheet supply unit 3 in a sheet conveying direction and is adapted to form an image on the sheet S supplied from the sheet supply unit 3. The discharge unit 8 is positioned downstream of the image-forming unit 5, and is adapted to discharge the sheet S on which the image has been formed to an outside of the main housing 2.

The sheet supply unit 3 includes a sheet cassette 30, a sheet supply mechanism 32, a conveyer roller 33a, and a registration roller 34.

The sheet cassette 30 is adapted to be attached to and detached from a lower portion of the main housing 2. That is, the sheet cassette 30 is movable between an attached position at which the sheet cassette 30 is attached to the main housing 2 and a detached position at which the sheet cassette 30 is detached from or pulled out of the main housing 2.

In the following description, the pulled out direction of the sheet cassette 30 will be referred to as "frontward" direction, and attaching direction will be referred to as "rearward" direction.

The sheet cassette 30 includes a lifter plate 31 for supporting the sheets S. The lifter plate 31 has a pivot shaft 31a, so that the lifter plate 31 is pivotally movable about the pivot shaft 31a by the drive force from the motor 4. Therefore, the sheets S placed on the lifter plate 31 can be moved upward so that the sheet S can be moved to a sheet supplying position.

The sheet supply mechanism 32 is adapted to separate each one of the sheets S from remaining sheets S placed in the sheet cassette 30, and to convey the separated sheet S toward the conveyer roller 33a. The sheet supply mechanism 32 includes a pick-up roller 32a, a separation roller 32b, and a separation pad 32c.

The pick-up roller 32a is adapted to pick-up a sheet S lifted to the sheet supply position by the lifter plate 31, and is positioned upward of a front end portion of the lifter plate 31. The separation roller 32b is positioned downstream of the pick-up roller 32a in the sheet conveying direction, and the separation pad 32c faces the separation roller 32b and is urged toward the separation roller 32b.

The sheet S picked-up by the pick-up roller 32a is conveyed toward the separation roller 32b, and the sheet S is separated from remaining sheets S at a position between the separation roller 32b and the separation pad 32c. In the image forming apparatus 1, a conveying passage L1 extends from the sheet supply mechanism 32 to the discharge unit 8 via the image-forming unit 5. The single sheet S thus separated by the separation roller 32b and the separation pad 32c is conveyed to the conveyer roller 33a along the conveying passage L1.

The conveyer roller 33a is adapted to impart conveying force to the sheet S, and is positioned downstream of the sheet supply mechanism 32 in the sheet conveying direction. A paper dust removing roller 33b is positioned in confrontation with the conveyer roller 33a. The sheet S conveyed toward the conveyer roller 33a from the sheet supply mechanism 32 is nipped between the conveyer roller 33a and the paper dust removing roller 33b, and is conveyed toward the registration roller 34 along the conveying passage L1.

The registration roller 34 is positioned downstream of the conveyer roller 33a in the sheet conveying direction. An opposing roller 35 is provided in confrontation with the registration roller 34. A leading end portion of the sheet S is abutted between the registration roller 34 and the opposing roller 35 and the sheet S is temporarily stopped, so that an orientation of the leading end portion is regulated by the registration roller 34 and the opposing roller 35. The registration roller 34 is adapted to convey the sheet S toward an image transferring position at a prescribed timing.

The image-forming unit 5 includes a process cartridge 50, an exposure unit 60, and a fixing unit 70. The process cartridge 50 is adapted to transfer an image onto a surface of the sheet S conveyed from the sheet supply unit 3, and includes a photosensitive drum 54. The exposure unit 60 is adapted to expose a surface of the photosensitive drum 54 to light. The fixing unit 70 is adapted to fix the transferred image to the sheet S.

The process cartridge 50 is positioned upward of the sheet supply unit 3 in the main housing 2, and includes a developing agent chamber 51, a supply roller 52, the developing roller 53, the photosensitive drum 54, and a transfer roller 55.

The exposure unit 60 includes a laser diode, a polygon mirror, lenses, and reflection mirrors. The exposure unit 60 is adapted to emit laser beam to expose the surface of photosensitive drum 54 to light for forming electrostatic latent image thereon on the basis of image data.

The developing agent chamber 51 accommodates therein toner as the developing agent. The toner in the developing agent chamber 51 is supplied to the supply roller 52 while the toner is agitated by an agitation member (not illustrated). The supply roller 52 is adapted to supply toner to the developing roller 53.

The developing roller 53 is disposed in contact with the supply roller 52, and is adapted to carry toner supplied from the supply roller 52. A friction member (not illustrated) is provided for charging the toner carried on the developing roller 53 with positive polarity. The developing roller 53 is applied with a developing bias having positive polarity by a bias application unit (not illustrated). The developing roller 53 is rotationally driven by the drive force from the motor 4 through the drive mechanism 20.

The photosensitive drum 54 is positioned adjacent to the developing roller 53. The surface of the photosensitive drum 54 is exposed to light by the exposure unit 60, after the surface is uniformly charged with positive polarity by a charger (not illustrated). The exposed region of the photosensitive drum 54 has a potential lower than that of the non-exposed region. Thus, an electrostatic latent image based on image data is formed on the photosensitive drum 54.

Then, positively charged toner is supplied to the surface of the photosensitive drum 54 from the developing roller 53, so that the electrostatic latent image becomes a visible toner image.

The transfer roller 55 is faced with the photosensitive drum 54, and is applied with negative transfer bias by the bias application unit (not illustrated). The toner image carried on the surface of the photosensitive drum 54 is transferred to the sheet S when the sheet S is nipped and conveyed through a transfer position between the photosensitive drum 54 and the transfer roller 55, while the transfer bias is applied to the surface of the transfer roller 55.

The fixing unit 70 includes a heat roller 71 and a pressure roller 72. The heat roller 71 is rotationally driven by the drive force from the motor 4, and the heat roller 71 is heated by electric power supply from a power source (not illustrated). The pressure roller 72 faces the heat roller 71 and in contact therewith. The pressure roller 72 is driven by the rotation of the heat roller 71. The toner image carried on the sheet S is thermally fixed to the sheet S when the sheet S conveyed along the conveying passage L1 is nipped and conveyed between the pressure roller 72 and the heat roller 71.

The discharge unit 8 includes a pair of discharge rollers 81 and a discharge tray 82. The pair of discharge rollers 81 is adapted to discharge sheet S conveyed from the fixing unit 70 toward an outside of the main housing 2. The discharge tray 82 is provided by an upper surface of the main housing 2. The sheet S discharged by the discharge rollers 81 is received on the discharge tray 82.

The discharge rollers 81 are rotatable in a forward direction in which the sheet S is discharged toward the discharge tray 82, and a reverse direction in which the sheet S discharged from the fixing unit 70 can be re-conveyed toward the image-forming unit 5.

In the housing 2, a re-conveying passage L2 is provided so that the sheet S driven by the discharge rollers 81 rotating in the reverse direction can be re-conveyed to the image-forming unit 5 along the re-conveying passage L2. Re-conveying rollers 36 are provided at the re-conveying passage L2, so that the sheet S can be conveyed toward the image-forming unit 5 by the rotation of the re-conveying rollers 36.

The re-conveying passage L2 is branched from the conveying passage L1 at a position between the fixing unit 70 and the discharge rollers 81, and is joined to the conveying passage L1 at a position between the conveyer roller 33a and the registration roller 34.

An image is formed on one surface of the sheet S at the image-forming unit 5, and the sheet S discharged from the fixing unit 70 is re-conveyed to the image-forming unit 5 via the re-conveying passage L2, so that another image can be formed on an opposite surface of the sheet S. Thus, both side printing can be performed in the image forming apparatus 1.

The drive mechanism 20 receives a rotational drive force as input from the motor 4 and outputs the rotational drive force to the developing roller 53. During operations of the image-forming unit 5, the rotational speed of the developing roller 53 can be switched between a speed used during developing operations and a speed used during non-developing operations. In a developing operation, the developing roller 53 supplies toner to the surface of the photosensitive drum 54 on which an electrostatic latent image has been formed in order to develop the latent image into a developer image. During a non-developing operation, the image-forming unit 5 is operating but not developing an image.

More specifically, the rotational speed of the developing roller 53 can be changed so that the developing roller 53 is rotated slower during non-developing operations than during developing operations.

Further, the image-forming unit 5 is halted when the discharge rollers 81 are driven to rotate in the reverse direction in order to reconvey a sheet S toward the image-forming unit 5. At this time, the drive mechanism 20 is configured to halt output of the rotational drive force to the developing roller 53.

Structure of the Drive Mechanism According to a First Embodiment

Next, the structure of the drive mechanism 20 according to the first embodiment will be described with reference to FIGS. 2A-3C. It is noted that teeth of the gears are indicated by their dedendum and addendum circles in the figures.

Figure 2A:
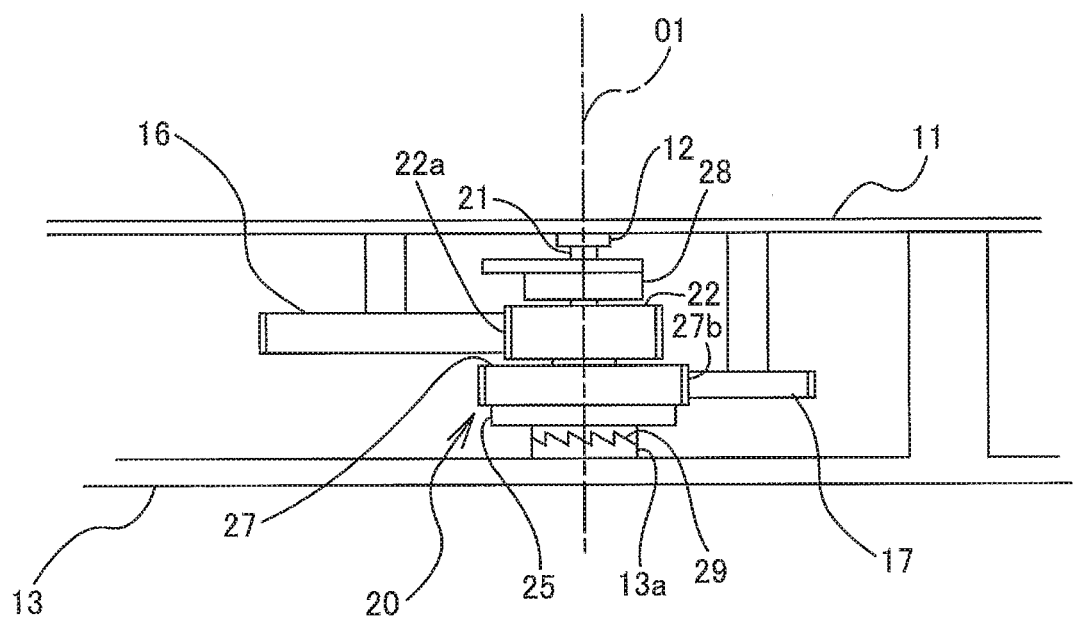
FIG. 2A is a side view, showing how the drive mechanism according to the first embodiment is in meshing engagement with both of a drive gear and an output transmission gear.
Figure 2B:
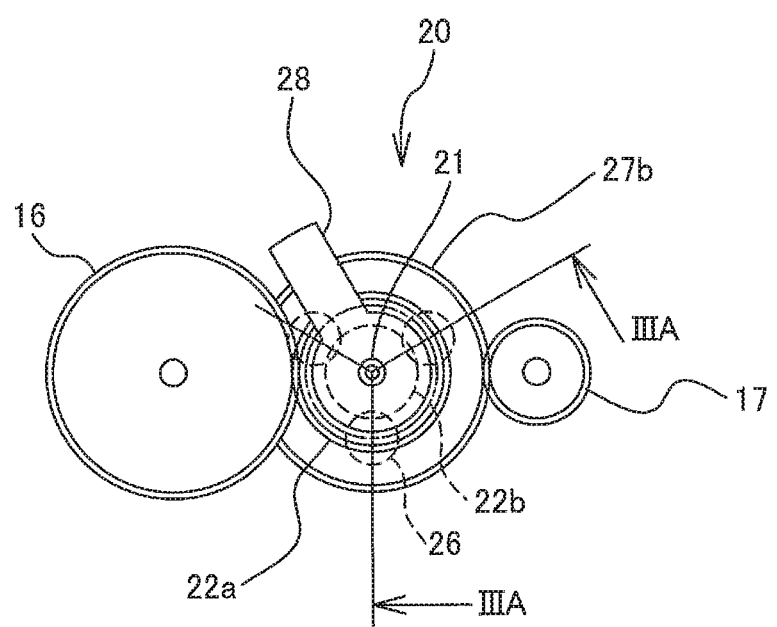
FIG. 2B is a plan view, showing how the drive mechanism is in meshing engagement with both of the drive gear and output transmission gear.

As shown in FIGS. 2A and 2B, a rotational drive force outputted from the motor 4 is inputted into the drive mechanism 20 via a drive gear 16. The drive mechanism 20 outputs the rotational drive force to an output transmission gear 17 connected to the developing roller 53.

More specifically, a gear plate 11 is fixed to a frame 13, which is attached to a rear wall of the main housing 2. The frame 13 is made of resin. The gear plate 11 is made of steel. The gear plate 11 is fixed to the frame 13 via screws (not shown) such that a space is formed between the gear plate 11 and the frame 13. All of the drive gear 16, drive mechanism 20, and output transmission gear 17 are disposed in the space between the gear plate 11 and the frame 13. The drive gear 16 and output transmission gear 17 are rotatably supported by the gear plate 11. Although not shown in the drawings, the drive gear 16 is in meshing engagement with a gear attached to the motor 4, and the output transmission gear 17 is in meshing engagement with a gear attached to the developing roller 53. The drive mechanism 20 is rotatably supported by both of the gear plate 11 and the frame 13. The drive mechanism 20 is connected with both of the drive gear 16 and output transmission gear 17.

With this configuration, a rotational drive force outputted from the motor 4 is inputted via the drive gear 16 into the drive mechanism 20. The rotational drive force is then outputted from the drive mechanism 20 to the output transmission gear 17. The rotational drive force is then transmitted from the output transmission gear 17 to the developing roller 53.

As shown in FIGS. 2A-3B, the drive mechanism 20 includes a rotational shaft 21, a two-stage gear 22, a ring gear 25, a plurality of (three, in this example) planetary gears 26, a carrier 27, an electromagnetic clutch 28, and a one-way clutch 29. As shown in FIG. 2A, one end of the rotational shaft 21 (which will be referred to as "first end of the rotational shaft 21" hereinafter) is rotatably supported by the gear plate 11 through a bearing 12. The other end of the rotational shaft 21 (which will be referred to as "second end of the rotational shaft 21" hereinafter) is rotatably supported by the frame 13 via a frame-side cylindrical protrusion 13a. The frame-side cylindrical protrusion 13a is made of the material the same as that of the frame 13, is formed into a circular cylindrical shape, and is fixed to the frame 13. The rotational shaft 21 is rotatable about its central axis O1. It is noted that indication of the bearing 12 is omitted from FIG. 2B.

Figure 3A:
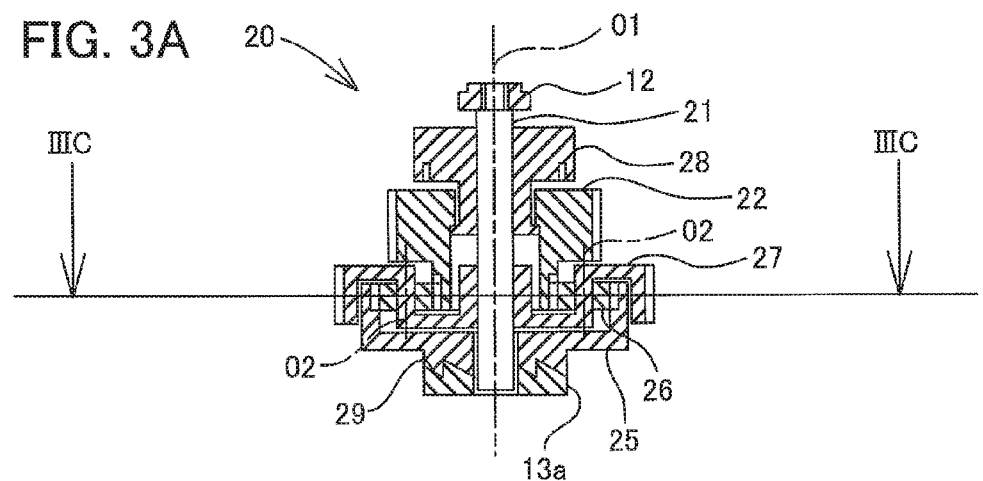
FIG. 3A is a cross-sectional side view of the drive mechanism taken along a line IIIA-IIIA in FIG. 2B.
Figure 3B:
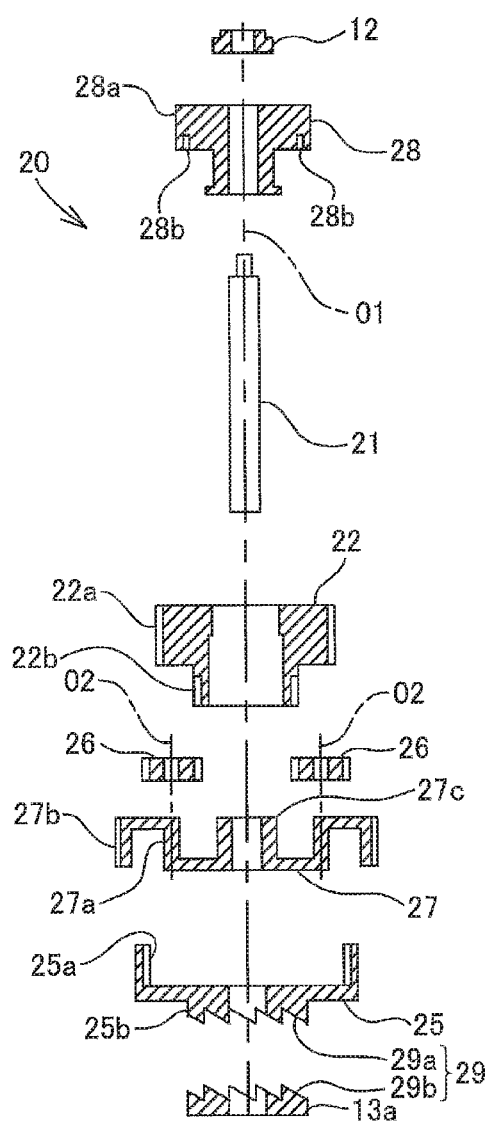
FIG. 3B is an exploded cross-sectional side view of the drive mechanism shown in FIG. 3A.
Figure 3C:
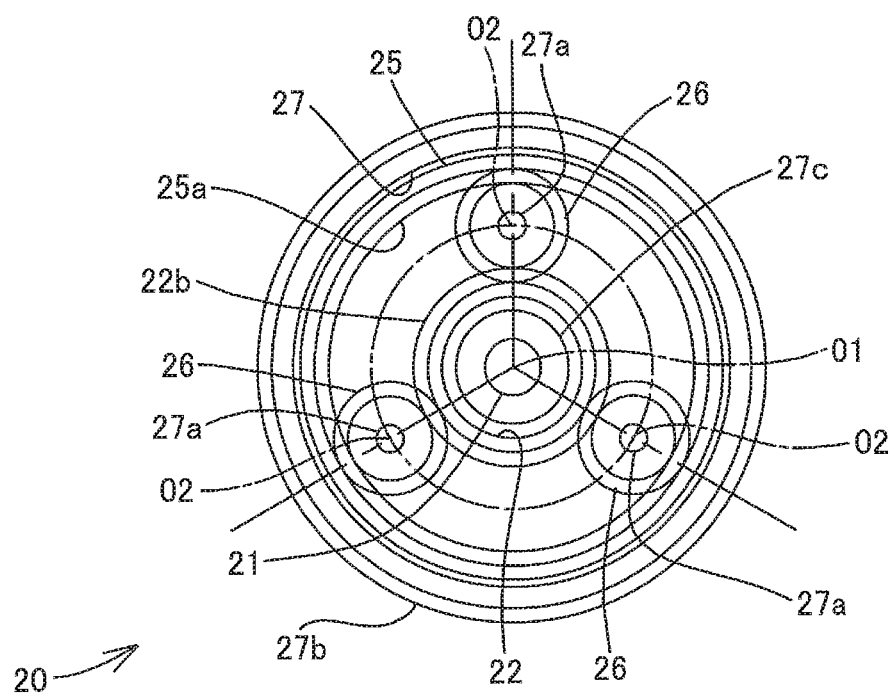
FIG. 3C is a cross-sectional view of the drive mechanism taken along a line IIIC-IIIC in FIG. 3A.

As shown in FIGS. 3A-3C, the two-stage gear 22 is rotatably provided on the rotational shaft 21 and is rotatable about the central axis O1 of the rotational shaft 21. The two-stage gear 22 can rotate relative to the rotational shaft 21. The two-stage gear 22 has an input gear 22a and a sun gear 22b. As shown in FIGS. 2A and 2B, the input gear 22a is engaged with the drive gear 16 to receive a rotational drive force inputted from the motor 4. The sun gear 22b rotates together with the input gear 22a. As shown in FIGS. 3B and 3C, gear teeth are formed around the outer circumferential surface of the sun gear 22b. As shown in FIG. 2B, the sun gear 22b is engaged with the planetary gears 26 as will be described later.

The two-stage gear 22 has a normal rotating direction and a reverse rotating direction. In this example, the normal rotating direction is the leftward rotating direction in FIG. 4 (indicated by the arrow in FIG. 4), and the reverse rotating direction is the rightward rotating direction in FIG. 4.

The drive gear 16 and the input gear 22a engaged with the drive gear 16 are configured as spur gears in this example.

As shown in FIGS. 3A-3C, the ring gear 25 is an annular gear having inner teeth 25a formed on the inner circumferential surface thereof. The ring gear 25 is disposed on the rotational shaft 21 and is rotatable about the central axis O1 of the rotational shaft 21. The ring gear 25 is capable of rotating relative to both of the rotational shaft 21 and the two-stage gear 22. As shown in FIG. 3B, the ring gear 25 is provided with a cylindrical protrusion 25b. The cylindrical protrusion 25b is in a circular cylindrical shape protruding from the ring gear 25 in a direction toward the frame 13 along the rotational axis O1 of the rotational shaft 21. The ring gear 25 and the cylindrical protrusion 25b are made of resin.

As shown in FIG. 3A-3C, the planetary gears 26 are disposed between the sun gear 22b of the two-stage gear 22 and the inner teeth 25a of the ring gear 25. The planetary gears 26 are engaged with both the sun gear 22b and the inner teeth 25a of the ring gear 25. The planetary gears 26 can rotate about their own rotational axes O2. The planetary gears 26 can also revolve around the central axis O1 of the rotational shaft 21. In other words, the planetary gears 26 can move along a circular orbit around the central axis O1 of the rotational shaft 21 as indicated by a one-dot chain line in FIGS. 2B and 3C.

As shown in FIGS. 3A-3C, the carrier 27 is provided on the rotational shaft 21 and is rotatable about the central axis O1 of the rotational shaft 21. The carrier 27 is capable of rotating together with the rotational shaft 21 and is capable of rotating relative to the two-stage gear 22 and ring gear 25.

The carrier 27 has a plurality of (three, in this example) planetary-gear support parts 27a, an output gear 27b, and a shaft support part 27c. The shaft support part 27c is in a circular cylindrical shape, through which the rotational shaft 21 is inserted with its central axis O1 being aligned with the central axis of the shaft support part 27c. The shaft support part 27c is fixed to the rotational shaft 21, and therefore the carrier 27 is not rotatable relative to the rotational shaft 21.

Each planetary-gear support part 27a is in a circular columnar shape, and supports one of the planetary gears 26 such that the central axis of the planetary-gear support part 27a is aligned with the rotational axis O2 of the planetary gear 26. With this configuration, each planetary gear 26 can revolve about the central axis O1 of the rotational shaft 21 together with the carrier 27, while rotating relative to the carrier 27 about its own rotational axis O2.

Gear teeth of the output gear 27b are formed around the outer circumferential surface of the carrier 27. The output gear 27b is engaged with the output transmission gear 17 as shown in FIGS. 2A and 2B. The carrier 27 outputs a rotational drive force from the output gear 27b to the output transmission gear 17.

The electromagnetic clutch 28 is an example of the drive force transmission switching member and is provided coaxially with the rotational shaft 21 as shown in FIG. 3A. The electromagnetic clutch 28 is disposed radially between the rotational shaft 21 and two-stage gear 22, and retains the two-stage gear 22 thereon. The electromagnetic clutch 28 can switch between a connecting state for connecting the two-stage gear 22 to the rotational shaft 21 so that the two-stage gear 22 and carrier 27 can rotate together via the rotational shaft 21, and a separating state for separating the two-stage gear 22 from the rotational shaft 21 so that the two-stage gear 22 can rotate relative to the carrier 27.

Figure 4:
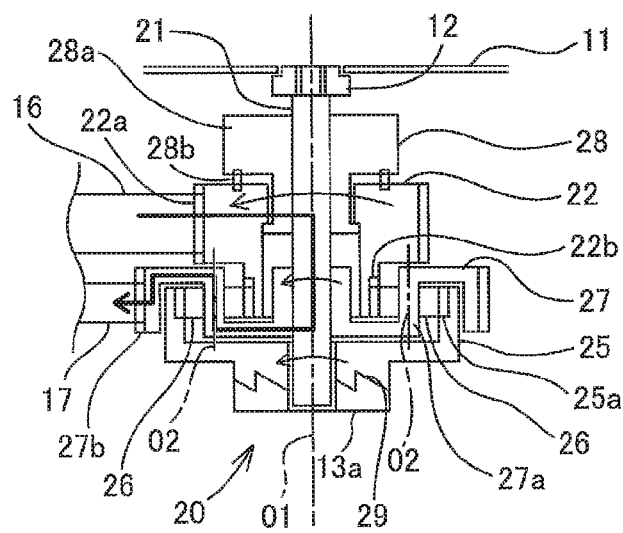
FIG. 4 is a cross-sectional side view showing how the drive mechanism according to the first embodiment transmits drive force in a first output state.

As shown in FIG. 3B, the electromagnetic clutch 28 includes a rotor 28a capable of rotating together with the rotational shaft 21, and an engaging part 28b that can be switched between an engaged state engaging the two-stage gear 22 and a disengaged state separated from the two-stage gear 22. When the engaging part 28b is in the engaged state, the electromagnetic clutch 28 is in the connecting state. More specifically, when the engaging part 28b is in the engaged state as shown in FIG. 4, the rotor 28a rotates together with the two-stage gear 22 owing to the engagement of the engaging part 28b and two-stage gear 22. At this time, the two-stage gear 22 rotates together with the carrier 27 because the rotor 28a can rotate together with the rotational shaft 21 and the carrier 27 can rotate together with the rotational shaft 21.

Figure 5:
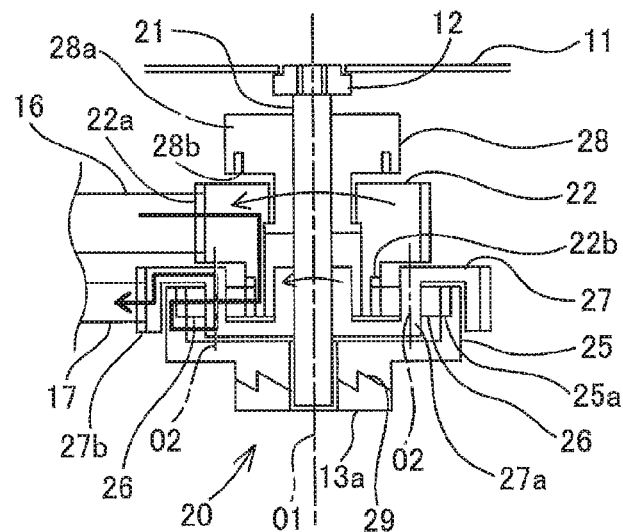
FIG. 5 is a cross-sectional side view showing how the drive mechanism according to the first embodiment transmits drive force in a second output state.
Figure 6:
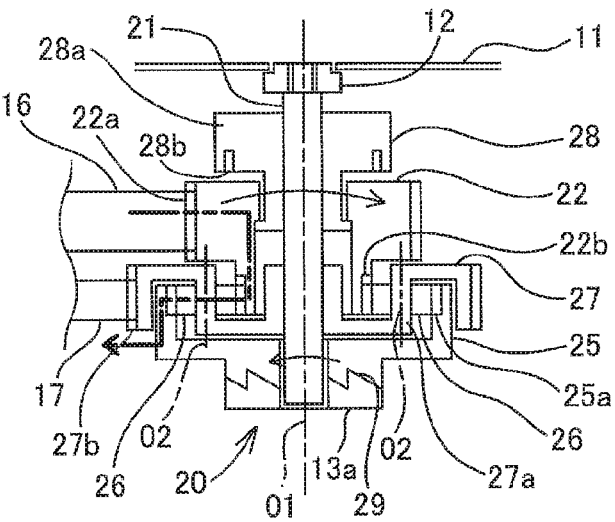
FIG. 6 is a cross-sectional side view showing how the drive mechanism according to the first embodiment transmits drive force in a third output state.

When the electromagnetic clutch 28 is in the disengaged state, the electromagnetic clutch 28 is in the separating state. More specifically, when the electromagnetic clutch 28 is in the disengaged state, as shown in FIGS. 5 and 6, the two-stage gear 22 can rotate relative to the rotor 28a due to the engaging part 28b being separated from the two-stage gear 22. Thus, the rotation of the two-stage gear 22 is not transferred to the rotational shaft 21. Accordingly, the two-stage gear 22 can rotate relative to the carrier 27.

As shown in FIGS. 2A and 3A, the one-way clutch 29 is provided coaxially with the rotational shaft 21. The one-way clutch 29 is configured to allow the ring gear 25 to rotate only in one direction about the central axis O1 of the rotational shaft 21. In the present embodiment, the one-way clutch 29 enables the ring gear 25 to rotate in the direction corresponding to the normal rotating direction of the two-stage gear 22 (leftward rotating direction indicated by the arrow in FIG. 4), and prohibits the ring gear 25 from rotating in the direction corresponding to the reverse rotating direction of the two-stage gear 22.

As shown in FIG. 3B, the one-way clutch 29 is configured from ring-gear-side ratchet grooves 29a that are formed on a distal end of the cylindrical protrusion 25b that confronts the frame 13; frame-side ratchet grooves 29b that are formed on a dietal end of the frame-side cylindrical protrusion 13a that confronts the ring gear 25; and a spring (not shown) connected between the ring gear 25 and the frame 13 so as to urge the ring gear 25 in a direction toward the frame 13 along the central axis O1 of the rotational shaft 21.

Both of the ring-gear-side ratchet groove 29a and frame-side ratchet grooves 29b are arranged around the entire circumference of the rotational shaft 21 so that each groove 29a, 29b extends radially outwardly from the rotational shaft 21. Each groove 29a, 29b has a parallel surface, which is in parallel with the central axis O1, and an inclined surface, which is inclined with respect to the central axis O1. The ring-gear-side ratchet grooves 29a are arranged with their parallel surfaces facing in the direction corresponding to the reverse rotating direction of the two-stage gear 22, while the frame-side ratchet grooves 29b are arranged with their parallel surfaces facing in the direction corresponding to the normal rotating direction of the two-stage gear 22.

With this configuration of the one-way clutch 29, the ring gear 25 can rotate relative to the frame-side cylindrical protrusion 13a in the direction corresponding to the normal rotating direction of the two-stage gear 22, with the inclined surfaces of the ring-gear-side ratchet grooves 29a sliding along the inclined surfaces of the frame-side ratchet grooves 29b. Contrarily, when the ring gear 25 is urged to rotate in the direction corresponding to the reverse rotating direction of the two-stage gear 22, the parallel surfaces of the ring-gear-side ratchet groove 29a are brought into abutment contact with the parallel surfaces of the frame-side ratchet grooves 29b, thereby being prohibited from rotating relative to the frame-side cylindrical protrusion 13a.

In the drive mechanism 20 having the structure described above, as shown in FIGS. 3A and 3B, the electromagnetic clutch 28, two-stage gear 22, carrier 27, ring gear 25, and one-way clutch 29 are arranged coaxially. Specifically, the electromagnetic clutch 28, two-stage gear 22, carrier 27, ring gear 25, and one-way clutch 29 are arranged in order from the first-end side of the rotational shaft 21 toward the second-end side as shown in FIG. 2A.

Output States of the Drive Mechanism According to the First Embodiment

The drive mechanism 20 according to the first embodiment having the structure described above has a plurality of output states and is switched among the output states according to: a combination of the rotating direction of the two-stage gear 22; and the switched state of the electromagnetic clutch 28, i.e., whether the electromagnetic clutch 28 is in the connecting state or the separating state.

The respective output states of the drive mechanism 20 will be described below with reference to FIGS. 4, 5, and 6. In FIGS. 4, 5, and 6, in order to make it easier to understand how the drive force is transmitted from the drive gear 16 through the drive mechanism 20 to the output transmission gear 17, the drive gear 16 and output transmission gear 17 are shown as being disposed at the same side with respect to the rotational shaft 21 of the drive mechanism 20, although the drive gear 16 and output transmission gear 17 are disposed at the opposite sides with respect to the rotational shaft 21 of the drive mechanism 20 as shown in FIGS. 2A and 2B.

The drive mechanism 20 is switched to the first output state when a drive force is inputted into the two-stage gear 22 for rotating the two-stage gear 22 in the direction that the ring gear 25 is rotatable, i.e., the normal rotating direction, after the electromagnetic clutch 28 has been switched to the connecting state.

As shown in FIG. 4, while the drive mechanism 20 is in the first output state, the two-stage gear 22 rotates in the normal direction, upon input of the rotational drive force into the input gear 22a of the two-stage gear 22 from the drive gear 16. Because the electromagnetic clutch 28 has been switched to the connecting state while the drive mechanism 20 is in the first output state, the two-stage gear 22 and carrier 27 rotate together, and the rotation of the carrier 27 is outputted to the output transmission gear 17. Because the carrier 27 rotates together with the two-stage gear 22 in this case, the drive mechanism 20 outputs a rotational drive force of the same rotating direction and the same speed as the rotational drive force inputted into the drive mechanism 20.

Further, because the sun gear 22b of the two-stage gear 22 rotates together with the carrier 27 while the drive mechanism 20 is in the first output state, the planetary gears 26 revolve about the central axis O1 of the rotational shaft 21 without rotating around their own rotational axes O2. Consequently, the ring gear 25 engaged with the planetary gears 26 rotates at the same rotational speed and in the same direction as the two-stage gear 22 and carrier 27.

The drive mechanism 20 is switched to the second output state when a drive force is inputted into the two-stage gear 22 for rotating the two-stage gear 22 in the direction that the ring gear 25 is rotatable, i.e., the normal rotating direction, after the electromagnetic clutch 28 has been switched to the separating state.

As shown in FIG. 5, while the drive mechanism 20 is in the second output state, the two-stage gear 22 rotates in the normal direction upon input of the rotational drive force into the input gear 22a of the two-stage gear 22 from the drive gear 16. Because the electromagnetic clutch 28 is in the separating state while the drive mechanism 20 is in the second output state, the two-stage gear 22 and carrier 27 are separated. Consequently, rotation of the two-stage gear 22 is not transmitted to the carrier 27 via the electromagnetic clutch 28 and rotational shaft 21.

When the sun gear 22b of the two-stage gear 22 rotates in the normal direction, the planetary gears 26 are urged to rotate about their rotational axes O2 and to revolve in the normal rotating direction about the central axis O1 at a slower rotational speed than that of the sun gear 22b. At the same time, the carrier 27 supporting the planetary gears 26 is also urged to rotate in the normal direction, along with the revolution of the planetary gears 26, at a slower speed than the rotational speed of the sun gear 22b. Further, the ring gear 25 is urged to rotate in the reverse direction, along with the rotation of the planetary gears 26, at a slower speed than the rotational speed of the sun gear 22b.

However, because the ring gear 25 can only rotate in the normal direction and not the reverse direction owing to the one-way clutch 29, the rotated position of the ring gear 25 remains fixed. Consequently, the carrier 27 is made to rotate, against the rotational load connected to the output gear 27b, in the normal direction at a slower rotational speed than that of the sun gear 22b. Thus, the rotational drive force outputted from the drive mechanism 20 while the drive mechanism 20 is in the second output state is in the same rotational direction as but at a slower speed than the force inputted into the drive mechanism 20.

The rotational speed outputted from the output gear 27b at this time can be expressed in Equation (1) below, where Za is the number of teeth on the sun gear 22b of the two-stage gear 22 engaged with the planetary gears 26, and Zc is the number of inner teeth 25a on the ring gear 25 also engaged with the planetary gears 26.

$$\langle\text{Rotational speed of output gear}\rangle = \langle\text{rotational speed of sun gear}\rangle \times (Za/(Za+Zc)) \quad (1)$$

The drive mechanism 20 is switched to a third output state when a drive force is inputted into the two-stage gear 22 for rotating the two-stage gear 22 in the direction that the ring gear 25 cannot rotate, i.e., the reverse rotating direction, after the electromagnetic clutch 28 has been switched to the separating state.

As shown in FIG. 6, while the drive mechanism 20 is in the third output state, the two-stage gear 22 rotates in the reverse direction upon input of the rotational drive force into the input gear 22a of the two-stage gear 22 from the drive gear 16. Because the electromagnetic clutch 28 is in the separating state while the drive mechanism 20 is in the third output state, the two-stage gear 22 and rotational shaft 21 are separated. Consequently, rotation of the two-stage gear 22 is not transmitted to the carrier 27 via the electromagnetic clutch 28 and rotational shaft 21.

When the sun gear 22b of the two-stage gear 22 rotates in the reverse direction, the planetary gears 26 are urged to rotate about their rotational axes O2 and also to revolve in the reverse direction about the central axis O1 at a slower speed than the rotational speed of the sun gear 22b. At the same time, the carrier 27 is urged to rotate in the reverse direction, along with the revolution of the planetary gears 26 in the reverse direction, at a slower speed than the rotational speed of the sun gear 22b. Additionally, the ring gear 25 is urged to rotate in the normal direction, along with the rotation of the planetary gears 26, at a slower speed than the rotational speed of the sun gear 22b.

In this case, the ring gear 25 can rotate in the normal direction and, because a rotational load is not connected to the ring gear 25, the ring gear 25 rotates in the normal direction at a slower speed than the rotational speed of the sun gear 22b. However, a rotational load is connected to the output gear 27b of the carrier 27. This rotational load applies a brake to the carrier 27, halting rotation of the same. Thus, output from the drive mechanism 20 is stopped while the drive mechanism 20 is in the third output state.

In this way, the output state of the drive mechanism 20 can be switched among the first output state in which a drive force equivalent in rotating speed and direction to the force inputted into the two-stage gear 22 is outputted from the carrier 27; the second output state in which a drive force equivalent in rotating direction to but slower in speed than the force inputted into the two-stage gear 22 is outputted from the carrier 27; and the third output state in which output from the carrier 27 is halted.

In the present embodiment, the drive mechanism 20 is switched to the first output state when performing a developing operation with the developing roller 53, is switched to the second output state when not performing a developing operation with the developing roller 53, and is switched to the third output state when the discharge rollers 81 are being driven to rotate in reverse for reconveying a sheet S toward the image-forming unit 5.

Thus, when the developing roller 53 is not developing, the drive mechanism 20 can rotate the developing roller 53 at a slower speed than the developing roller 53 rotates when developing. Further, when the discharge rollers 81 are driven to rotate in reverse to convey a sheet S toward the image-forming unit 5, the drive mechanism 20 can halt rotation of the developing roller 53.

Note that the output destination for the drive force outputted from the drive mechanism 20 is not limited to the developing roller 53, but may be another driven member.

An image forming apparatus 101 according to a second embodiment will be described with reference to FIGS. 1 and 7A through 10.

The image forming apparatus 101 according to the second embodiment is the same as the image forming apparatus 1 of the first embodiment except that according to the second embodiment, a drive gear 116 is employed in place of the drive gear 16 in the first embodiment, and a drive mechanism 120 is employed in place of the drive mechanism 20 in the first embodiment.

The drive gear 116 of the second embodiment is the same as the drive gear 16 in the first embodiment except that the drive gear 116 is configured as a helical gear.

Structure of the Drive Mechanism According to the Second Embodiment

The drive mechanism 120 according to the second embodiment will be described below with reference to FIGS. 7A-10. It is noted that teeth are indicated by their dedendum and addendum circles in the figures.

Figure 7A:
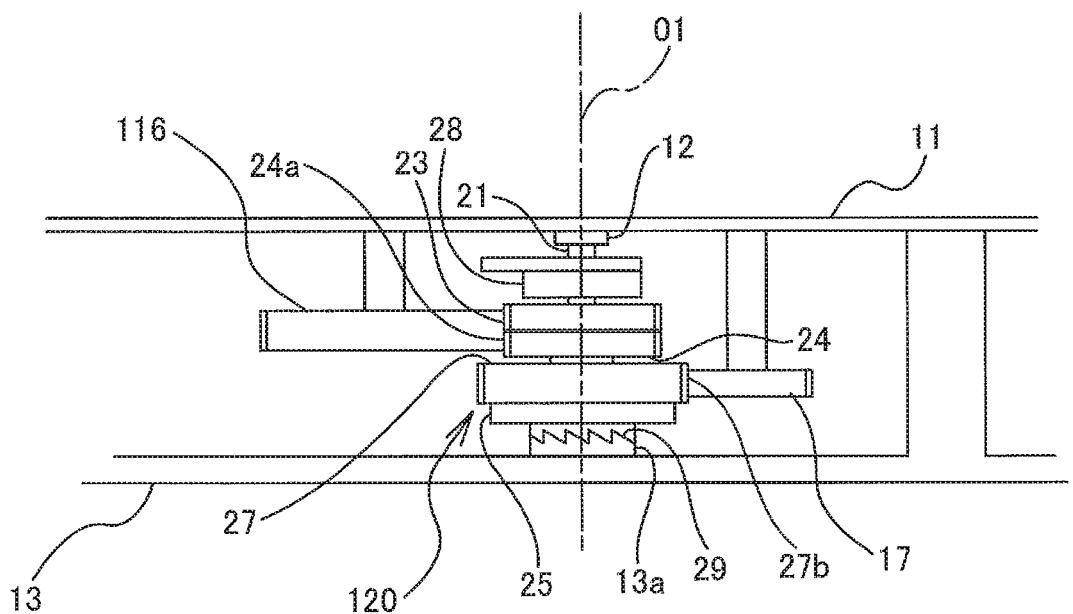
FIG. 7A is a side view, showing how a drive mechanism according to a second embodiment is in meshing engagement with both of a drive gear and an output transmission gear.
Figure 7B:
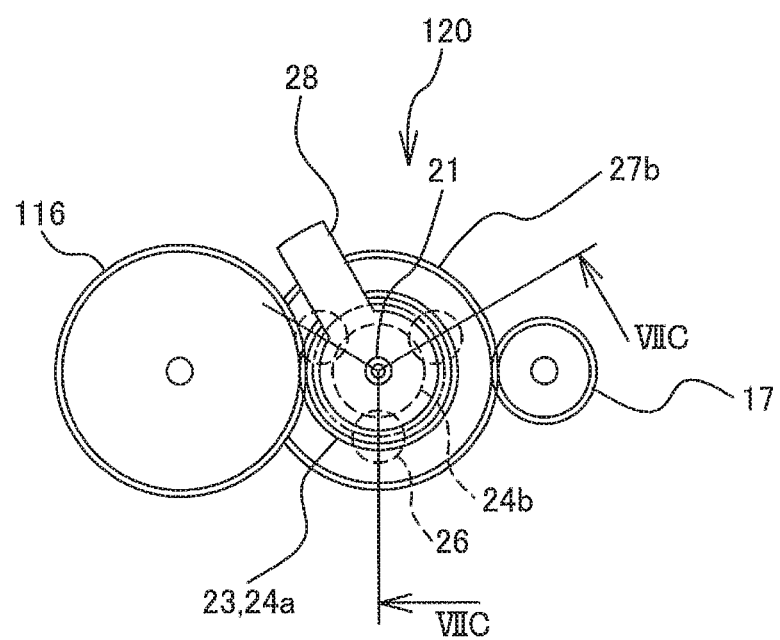
FIG. 7B is a plan view, showing how the drive mechanism of the second embodiment is in meshing engagement with both of the drive gear and output transmission gear.

According to the second embodiment, as shown in FIGS. 7A and 7B, a rotational drive force outputted from the motor 4 is inputted via the drive gear 116 into the drive mechanism 120. The drive mechanism 120 outputs the rotational drive force to the output transmission gear 17, similarly to the drive mechanism 20 of the first embodiment.

The drive mechanism 120 in the second embodiment differs from the drive mechanism 20 in the first embodiment primarily in that the two-stage gear 22 in the first embodiment is replaced with a first input gear 23 and a two-stage gear 24 in the second embodiment.

More specifically, as shown in FIGS. 7A-7D, the drive mechanism 120 according to the second embodiment includes the rotational shaft 21, the first input gear 23, the two-stage gear 24, the ring gear 25, the planetary gears 26, the carrier 27, the electromagnetic clutch 28, and the one-way clutch 29.

As shown in FIGS. 7A-7D, the rotational shaft 21 according to the second embodiment has a configuration identical to the rotational shaft 21 in the first embodiment and, hence, a description of the rotational shaft 21 will not be repeated.

Figure 7C:
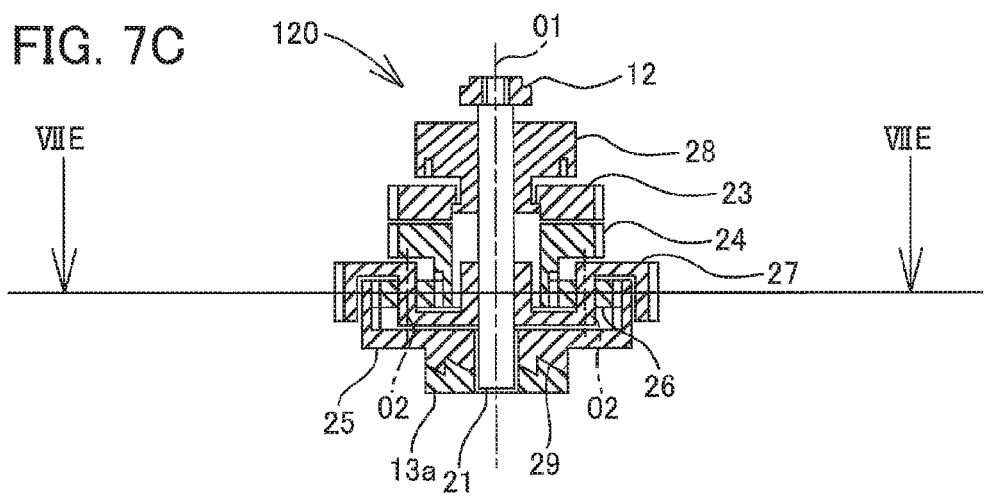
FIG. 7C is a cross-sectional side view of the drive mechanism taken along a line VIIC-VIIC in FIG. 7B.
Figure 7D:
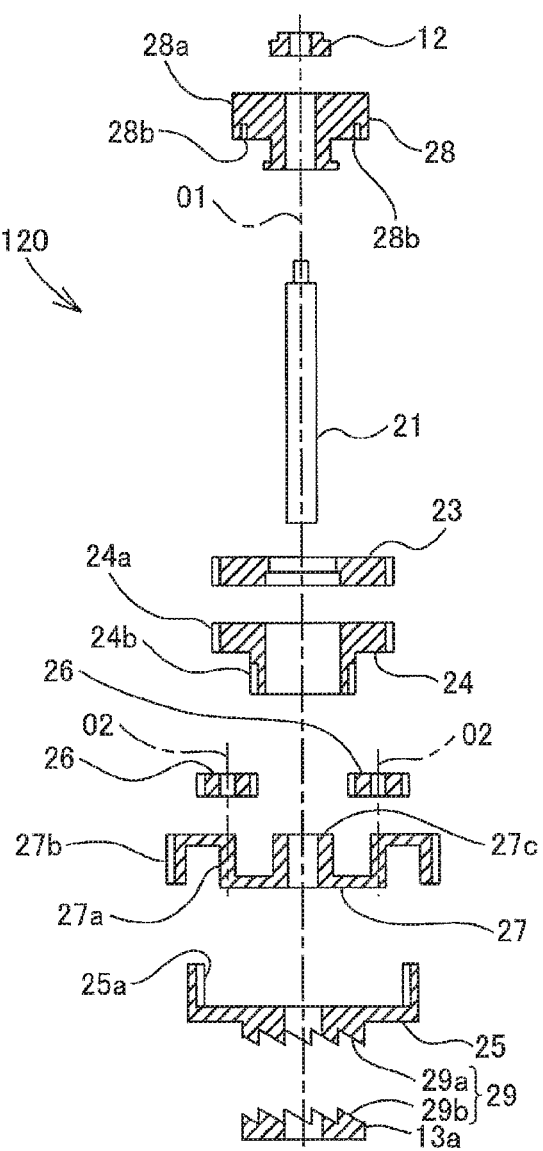
FIG. 7D is an exploded cross-sectional side view of the drive mechanism shown in FIG. 7C.

As shown in FIGS. 7A, 7C, and 7D, the first input gear 23 is disposed on the rotational shaft 21 so as to be rotatable about the central axis O1 of the rotational shaft 21. The first input gear 23 can rotate relative to the rotational shaft 21. As shown in FIGS. 7A and 7B, the first input gear 23 is engaged with the drive gear 116 and receives a rotational drive force inputted from the motor 4 via the drive gear 116.

Figure 7E:
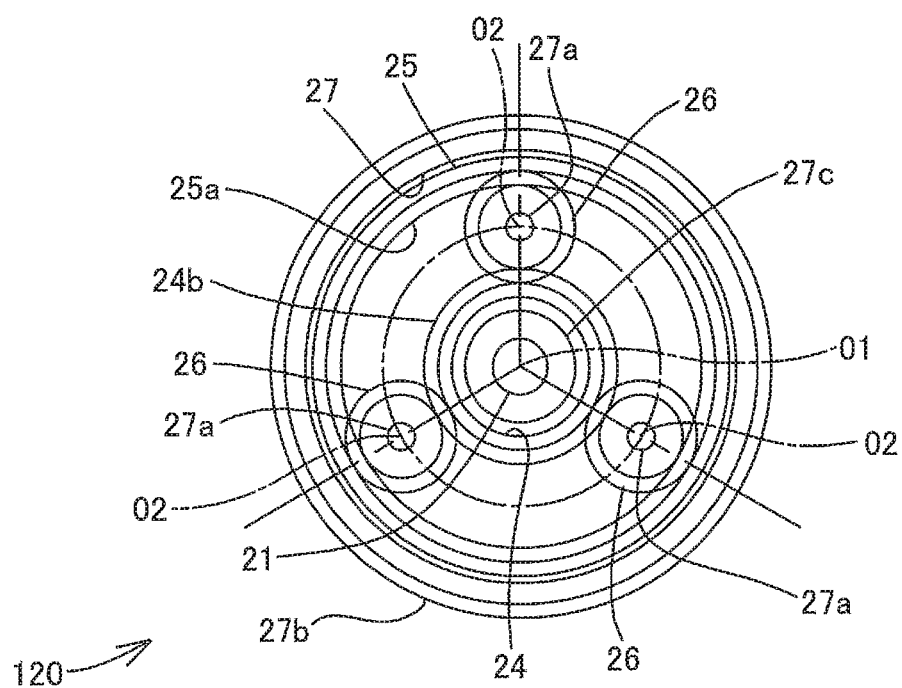
FIG. 7E is a cross-sectional view of the drive mechanism taken along a line VIIE-VIIE in FIG. 7C.

As shown in FIGS. 7A and 7C, the two-stage gear 24 is disposed on the rotational shaft 21 so as to be rotatable about the central axis O1 of the rotational shaft 21. The two-stage gear 24 can rotate relative to the rotational shaft 21. As shown in FIG. 7D, the two-stage gear 24 has a second input gear 24a and a sun gear 24b. As shown in FIGS. 7A and 7B, the second input gear 24a is engaged with the drive gear 116 to receive the inputted rotational drive force from the motor 4. The sun gear 24b rotates together with the second input gear 24a. As shown in FIGS. 7D and 7E, gear teeth are formed around the outer circumferential surface of the sun gear 24b.

The first input gear 23 and two-stage gear 24 have a normal rotating direction and a reverse rotating direction. As an example, the normal rotating direction is the leftward rotating direction in FIG. 8 (indicated by the arrow in FIG. 8), and the reverse rotating direction is the rightward rotating direction in FIG. 8. The first input gear 23 and the second input gear 24a of the two-stage gear 24 that are engaged with the drive gear 116 are configured as helical gears. The numbers of teeth formed on the first input gear 23 and second input gear 24a are equal to each other.

As shown in FIGS. 7A and 7C, the ring gear 25 in the second embodiment is disposed on the rotational shaft 21 so as to be rotatable about the central axis O1 of the rotational shaft 21. As shown in FIG. 7D, the ring gear 25 has a configuration identical to the ring gear 25 in the first embodiment and, hence, a description of the ring gear 25 will not be repeated.

As shown in FIG. 7C, the planetary gears 26 are disposed between the sun gear 24b of the two-stage gear 24 and the inner teeth 25a of the ring gear 25. The planetary gears 26 are engaged with both the sun gear 24b of the two-stage gear 24 and the inner teeth 25a of the ring gear 25. The planetary gears 26 can rotate about their respective rotational axes O2 and can revolve around the central axis O1 of the rotational shaft 21. The planetary gears 26 of the second embodiment have a configuration identical to the planetary gears 26 in the first embodiment and, hence, a description of the planetary gears 26 will not be repeated.

As shown in FIGS. 7A and 7C, the carrier 27 in the second embodiment is disposed on the rotational shaft 21 so as to be rotatable about the central axis O1 of the rotational shaft 21. The carrier 27 of the second embodiment has a configuration identical to the carrier 27 in the first embodiment and, hence, a description of the carrier 27 will not be repeated.

The electromagnetic clutch 28 is an example of the drive force transmission switching member and is provided coaxially with the rotational shaft 21. As shown in FIG. 7C, the electromagnetic clutch 28 is disposed radially between the rotational shaft 21 and first input gear 23, and retains the first input gear 23 thereon. The electromagnetic clutch 28 can switch between a connecting state for connecting the first input gear 23 to the rotational shaft 21 so that the first input gear 23 and carrier 27 can rotate together via the rotational shaft 21, and a separating state for separating the first input gear 23 from the rotational shaft 21 so that the first input gear 23 can rotate relative to the carrier 27.

The electromagnetic clutch 28 of the second embodiment has a configuration substantially identical to the electromagnetic clutch 28 in the first embodiment except for the points described below. That is, in the first embodiment, the engaging part 28b of the electromagnetic clutch 28 is engaged with and separated from the two-stage gear 22. In contrast, according to the present embodiment, the engaging part 28b of the electromagnetic clutch 28 is engaged with and separated from the first input gear 23.

Figure 8:
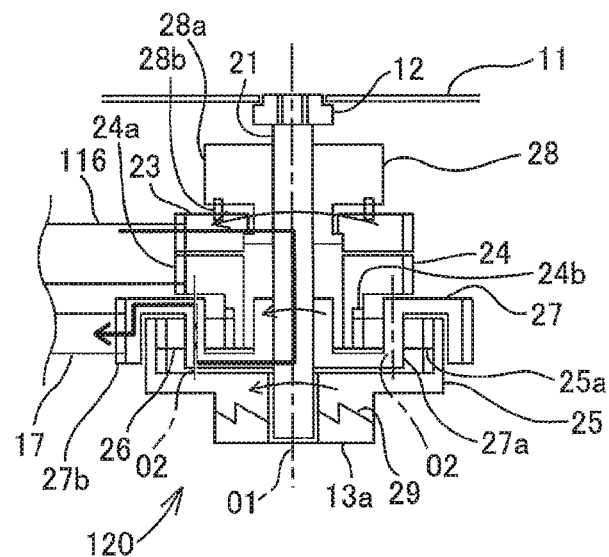
FIG. 8 is a cross-sectional side view showing how the drive mechanism according to the second embodiment transmits drive force in a first output state.

When the electromagnetic clutch 28 is in the connecting state, as shown in FIG. 8, the first input gear 23 rotates together with the rotor 28a owing to the engagement of the engaging part 28b and first input gear 23. Accordingly, the first input gear 23 rotates together with the carrier 27 because the rotor 28a can rotate together with the rotational shaft 21 and the carrier 27 can rotate together with the rotational shaft 21.

Figure 9:
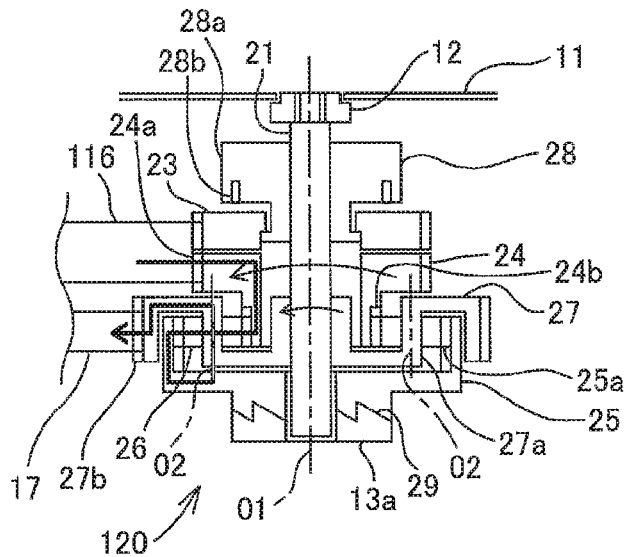
FIG. 9 is a cross-sectional side view showing how the drive mechanism according to the second embodiment transmits drive force in a second output state.
Figure 10:
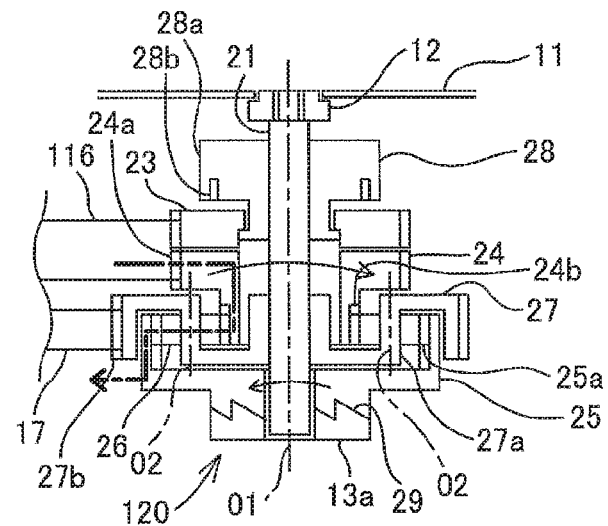
FIG. 10 is a cross-sectional side view showing how the drive mechanism according to the second embodiment transmits drive force in a third output state.

When the electromagnetic clutch 28 is in the separating state, as shown in FIGS. 9 and 10, the first input gear 23 can rotate relative to the rotor 28a due to the engaging part 28b being separated from the first input gear 23. Thus, the rotation of the first input gear 23 is not transmitted to the rotational shaft 21. The first input gear 23 can rotate relative to the carrier 27.

As shown in FIGS. 7A, 7C, and 7D, the one-way clutch 29 is arranged coaxially with the rotational shaft 21. The one-way clutch 29 of the second embodiment has a configuration identical to the one-way clutch 29 in the first embodiment, and therefore a description of the one-way clutch 29 will not be repeated.

In the drive mechanism 120 having the structure described above, the electromagnetic clutch 28, first input gear 23, two-stage gear 24, carrier 27, ring gear 25, and one-way clutch 29 are arranged coaxially as shown in FIGS. 7A and 7C. Specifically, the electromagnetic clutch 28, first input gear 23, two-stage gear 24, carrier 27, ring gear 25, and one-way clutch 29 are arranged in order from the first-end side of the rotational shaft 21 (gear plate 11 side) toward the second-end side (frame 13 side) as shown in FIG. 7A.

Output States of the Drive Mechanism According to the Second Embodiment

The drive mechanism 120 according to the second embodiment having the structure described above has a plurality of output states and is switched among the output states according to the rotating direction of the first input gear 23 and two-stage gear 24 and the switched state of the electromagnetic clutch 28, i.e., whether the electromagnetic clutch 28 is in the connecting state or the separating state.

The respective output states of the drive mechanism 120 will be described below with reference to FIGS. 8, 9, and 10. In FIGS. 8-10, in order to make it easier to understand how the drive force is transmitted from the drive gear 116 through the drive mechanism 120 to the output transmission gear 17, the drive gear 116 and output transmission gear 17 are shown at the same side with respect to the rotational shaft 21 of the drive mechanism 120, although the drive gear 16 and output transmission gear 17 are disposed at the opposite sides with respect to the rotational shaft 21 of the drive mechanism 120 as shown in FIGS. 7A and 7B.

The drive mechanism 120 is switched to the first output state when a drive force is inputted into the first input gear 23 and second input gear 24a of the two-stage gear 24 in the direction that the ring gear 25 is rotatable, i.e., the normal rotating direction, after the electromagnetic clutch 28 has been switched to the connecting state.

As shown in FIG. 8, while the drive mechanism 120 is in the first output state, the first input gear 23 and two-stage gear 24 rotate at the same speed with respect to each other in the normal direction, upon input of the rotational drive force into the first input gear 23 and second input gear 24a of the two-stage gear 24 from the drive gear 116. Because the electromagnetic clutch 28 has been switched to the connecting state while the drive mechanism 120 is in the first output state, the first input gear 23 and carrier 27 rotate together, and the rotation of the carrier 27 is outputted to the output transmission gear 17. Because the carrier 27 rotates together with the first input gear 23 in this case, the drive mechanism 120 outputs a rotational drive force of the same rotating direction and the same speed as the force inputted into the drive mechanism 120.

Further, since the sun gear 24b of the two-stage gear 24 and the carrier 27 rotate in the same direction and at the same speed with each other while the drive mechanism 120 is in the first output state, the planetary gears 26 revolve about the central axis O1 of the rotational shaft 21 without rotating about their own rotational axes O2. Consequently, the ring gear 25 engaged with the planetary gears 26 rotates in the same direction and at the same speed as the sun gear 24b and carrier 27.

The drive mechanism 120 is switched to the second output state when a drive force is inputted into the first input gear 23 and second input gear 24a of the two-stage gear 24 in the direction that the ring gear 25 is rotatable, i.e., the normal rotating direction, after the electromagnetic clutch 28 has been switched to the separating state.

As shown in FIG. 9, while the drive mechanism 120 is in the second output state, the first input gear 23 and two-stage gear 24 rotate at the same speed with each other in the normal direction, upon input of the rotational drive force into the first input gear 23 and second input gear 24a of the two-stage gear 24 from the drive gear 116. Because the electromagnetic clutch 28 is in the separating state while the drive mechanism 120 is in the second output state, the first input gear 23 and rotational shaft 21 are separated. Consequently, rotation of the first input gear 23 is not transmitted to the carrier 27 via the electromagnetic clutch 28 and rotational shaft 21.

On the other hand, when the sun gear 24b of the two-stage gear 24 rotates in the normal direction, the planetary gears 26 are urged to rotate about their rotational axes O2 and also to revolve in the normal rotating direction about the central axis O1 at a slower speed than the rotating speed of the sun gear 24b. At this time, the carrier 27 supporting the planetary gears 26 is also urged to rotate in the normal direction, along with the revolution of the planetary gears 26, at a slower rotational speed than that of the sun gear 24b. Further, the ring gear 25 is also urged to rotate in the reverse direction, along with the rotation of the planetary gears 26, at a slower speed than the rotational speed of the sun gear 24b. However, because the ring gear 25 can only rotate in the normal direction and not the reverse direction owing to the one-way clutch 29, the rotated position of the ring gear 25 remains fixed. Consequently, the carrier 27 is driven to rotate in the normal direction against the rotational load connected to the output gear 27b at a slower rotational speed than that of the sun gear 24b. Thus, the rotational drive force outputted from the drive mechanism 120 while the drive mechanism 120 is in the second output state has the same rotational direction as but a slower speed than the force inputted into the drive mechanism 120.

The rotational speed outputted from the output gear 27b at this time can be expressed in Equation (1) described above, where Za is the number of teeth on the sun gear 24b of the two-stage gear 24 and Zc is the number of inner teeth 25a on the ring gear 25, similarly to described in the first embodiment.

Since the drive gear 116, first input gear 23, and second input gear 24a of the two-stage gear 24 are configured of helical gears in the second embodiment, a rotational load applied to the first input gear 23 and two-stage gear 24 produces a force along the rotational shaft 21 proportional to the rotational load.

Further, if the electromagnetic clutch 28 is in the separating state and the first input gear 23 disposed adjacent to the electromagnetic clutch 28 rotates while applying force to the electromagnetic clutch 28 along the rotational shaft 21, the first input gear 23 and the electromagnetic clutch 28 will slide against each other. This sliding contact will reduce the lifespan of the electromagnetic clutch 28.

However, according to the drive mechanism 120 of the second embodiment, when the electromagnetic clutch 28 is in the separating state, the first input gear 23 and rotational shaft 21 are separated from each other, and therefore the rotational load applied to the output gear 27b of the carrier 27 is not transmitted to the first input gear 23 via the planetary gears 26 or rotational shaft 21.

Because a rotational load is not transmitted from the carrier 27 to the first input gear 23 while the electromagnetic clutch 28 is in the separating state, a force along the rotational shaft 21 is not generated in the first input gear 23. Hence, the first input gear 23 is not pressed against the electromagnetic clutch 28, and the first input gear 23 and electromagnetic clutch 28 do not slide against each other. Thus, the rotational load has no adverse effect on the lifespan of the electromagnetic clutch 28.

Further, the drive mechanism 120 is switched to the third output state when a drive force is inputted into the first input gear 23 and second input gear 24a of the two-stage gear 24 in the direction that the ring gear 25 cannot rotate, i.e., the reverse rotating direction, after the electromagnetic clutch 28 has been switched to the separating state.

As shown in FIG. 10, while the drive mechanism 120 is in the third output state, the first input gear 23 and two-stage gear 24 rotate in the reverse direction upon input of the rotational drive force into the first input gear 23 and the second input gear 24a of the two-stage gear 24 from the drive gear 116. Because the electromagnetic clutch 28 is in the separating state while the drive mechanism 120 is in the third output state, the first input gear 23 and rotational shaft 21 are separated. Consequently, rotation of the first input gear 23 is not transmitted to the carrier 27 via the electromagnetic clutch 28 and rotational shaft 21.

When the sun gear 24b of the two-stage gear 24 rotates in the reverse direction, the planetary gears 26 are urged to rotate about their rotational axes O2 and also to revolve in the reverse direction about the central axis O1 at a slower speed than the rotational speed of the sun gear 24b. At this time, the carrier 27 is also urged to rotate with the planetary gears 26 in the reverse direction at a slower rotational speed than that of the sun gear 24b. Further, the ring gear 25 is also urged to rotate in the normal direction, along with the rotation of the planetary gears 26, at a slower speed than the rotational speed of the sun gear 24b.

Because the ring gear 25 is capable of rotating in the normal direction and a rotational load is not connected to the ring gear 25, the ring gear 25 rotates in the normal direction at a slower rotational speed than that of the sun gear 24b. However, a rotational load is connected to the output gear 27b of the carrier 27. The rotational load applies a brake to the carrier 27, halting rotation of the same. Thus, output from the drive mechanism 120 is stopped while the drive mechanism 120 is in the third output state.

In this way, the output state of the drive mechanism 120 according to the second embodiment can be switched among: the first output state in which a drive force having the same rotating direction and the same speed as the force inputted into the first input gear 23 and the second input gear 24a of the two-stage gear 24 is outputted from the carrier 27; the second output state in which a drive force having the same rotating direction as but a slower speed than the force inputted into the first input gear 23 and the second input gear 24a of the two-stage gear 24 is outputted from the carrier 27; and the third output state in which output from the carrier 27 is halted.

The drive mechanism 120 according to the second embodiment is also switched to the first output state when performing a developing operation with the developing roller 53, is switched to the second output state when not performing a developing operation with the developing roller 53, and is switched to the third output state when the discharge rollers 81 are being driven to rotate in reverse for reconveying a sheet S toward the image-forming unit 5.

Note that the output destination for the rotational drive force outputted from the drive mechanism 120 according to the second embodiment is not limited to the developing roller 53, but may be another driven member.

Advantages Of The Embodiments

As described above in the first embodiment, the drive mechanism 20 of the image forming apparatus 1 is configured with the rotational shaft 21, two-stage gear 22, ring gear 25, planetary gears 26, carrier 27, electromagnetic clutch 28, and one-way clutch 29. The two-stage gear 22 is disposed on the rotational shaft 21 so as to be rotatable about the central axis O1 and has the sun gear 22b with outer teeth formed on the outer circumferential surface thereof, and the input gear 22a that receives a drive force inputted from the drive gear 16. The ring gear 25 is disposed on the rotational shaft 21 so as to be rotatable about the central axis O1 and rotatable relative to the two-stage gear 22. The ring gear 25 has the inner teeth 25a formed on the inner circumferential surface thereof. The planetary gears 26 are disposed between the sun gear 22b of the two-stage gear 22 and the inner teeth 25a of the ring gear 25 and are engaged with both the sun gear 22b and the inner teeth 25a. The carrier 27 is disposed on the rotational shaft 21 so as to be capable of rotating together with the rotational shaft 21 about the central axis O1. The carrier 27 is capable of rotating relative to the two-stage gear 22 and the ring gear 25. The carrier 27 supports the planetary gears 26 so that the planetary gears 26 can rotate about their own rotational axes O2 and can revolve about the central axis O1. The carrier 27 outputs the drive force. The electromagnetic clutch 28 is disposed coaxially with the rotational shaft 21. The electromagnetic clutch 28 is configured to be switchable between a connecting state for connecting the two-stage gear 22 and carrier 27 so that they can rotate together via the rotational shaft 21, and a separating state for separating the two-stage gear 22 and carrier 27 so that they can rotate relative to each other. The one-way clutch 29 is disposed coaxially with the rotational shaft 21. The one-way clutch 29 allows the ring gear 25 to rotate in only one direction about the central axis O1 of the rotational shaft 21.

The above configuration provides a drive mechanism 20 capable of changing the state of output from the carrier 27 by switching the rotating direction of input into the input gear 22a of the two-stage gear 22 and by switching the state of the electromagnetic clutch 28 between the connecting state and separating state, and enables the drive mechanism 20 to be made compact by providing the two-stage gear 22, ring gear 25, carrier 27, electromagnetic clutch 28, and one-way clutch 29 coaxially. Further, since the meshed state of gears in the drive mechanism 20 is not changed when changing the output state, the structure of the embodiment can increase the lifespan of the drive mechanism 20.

In addition, the drive mechanism 20 can be switched between a first output state, a second output state, and a third output state. In the first output state, in a state that the electromagnetic clutch 28 has been switched to the connecting state, a drive force for rotating the sun gear 22b of the two-stage gear 22 in the direction that the ring gear 25 is rotatable is inputted into the sun gear 22b via the input gear 22a of the two-stage gear 22, thereby outputting from the carrier 27 a drive force having the same rotating direction and the same speed as the force inputted into the sun gear 22b. In the second output state, in a state that the electromagnetic clutch 28 has been switched to the separating state, a drive force for rotating the sun gear 22b of the two-stage gear 22 in the direction that the ring gear 25 is rotatable is inputted into the sun gear 22b via the input gear 22a of the two-stage gear 22, thereby outputting from the carrier 27 a drive force having the same rotating direction as but a slower speed than the force inputted into the sun gear 22b. In the third output state, in a state that the electromagnetic clutch 28 has been switched to the separating state, a drive force for rotating the sun gear 22b of the two-stage gear 22 in the direction that the ring gear 25 is not rotatable is inputted into the sun gear 22b via the input gear 22a of the two-stage gear 22, thereby halting output from the carrier 27.

With the above configuration, the output state of the drive mechanism 20 is switched to the first output state to drive the driven member with output supplied from the carrier 27 and is switched to the second output state and third output state, respectively, when preliminary driving of the driven member is allowed and when it is unnecessary to drive the driven member. In this way, the drive mechanism 20 can drive the driven member only when necessary so that the life of the driven member can be extended.

The drive mechanism 120 according to the second embodiment includes the rotational shaft 21, first input gear 23, two-stage gear 24, ring gear 25, planetary gears 26, carrier 27, electromagnetic clutch 28, and one-way clutch 29. The first input gear 23 is disposed on the rotational shaft 21 so as to be rotatable about the central axis O1 of the rotational shaft 21. The first input gear 23 is configured of a helical gear that is engaged with the drive gear 116, which is also configured of a helical gear, to receive an inputted drive force therefrom. The two-stage gear 24 is disposed on the rotational shaft 21 so as to be rotatable about the central axis O1. The two-stage gear 24 has the second input gear 24a configured of a helical gear that is engaged with the drive gear 116 for receiving an inputted drive force therefrom, and the sun gear 24b. The ring gear 25 is disposed on the rotational shaft 21 so as to be rotatable about the central axis O1 of the rotational shaft 21 and is capable of rotating relative to the two-stage gear 24. The ring gear 25 has the inner teeth 25a formed on the inner circumferential surface thereof. The planetary gears 26 are disposed between the sun gear 24b of the two-stage gear 24 and the inner teeth 25a of the ring gear 25 and are engaged with both the sun gear 24b and the inner teeth 25a. The carrier 27 is disposed on the rotational shaft 21 so as to be capable of rotating together with the rotational shaft 21 about the central axis O1. The carrier 27 is capable of rotating relative to the two-stage gear 24 and ring gear 25. The carrier 27 supports the planetary gears 26 so that the planetary gears 26 can rotate about their rotational axes O2 and revolve about the central axis O1. The carrier 27 outputs the drive force. The electromagnetic clutch 28 is disposed coaxially with the rotational shaft 21. The electromagnetic clutch 28 is configured to be switchable between a connecting state for connecting the first input gear 23 and carrier 27 so that they can rotate together via the rotational shaft 21, and a separating state for separating the first input gear 23 and carrier 27 so that they can rotate relative to each other. The one-way clutch 29 is disposed coaxially with the rotational shaft 21. The one-way clutch 29 allows the ring gear 25 to rotate in only one direction about the central axis O1 of the rotational shaft 21.

The above configuration provides a drive mechanism 120 capable of changing the state of output from the carrier 27 by switching the rotating direction of the drive gear 116 that rotates while engaged with both the first input gear 23 and the second input gear 24a of the two-stage gear 24 and by switching the state of the electromagnetic clutch 28 between the connecting state and separating state. By providing the first input gear 23, two-stage gear 24 having the second input gear 24a and sun gear 24b, ring gear 25, carrier 27, electromagnetic clutch 28, and one-way clutch 29 coaxially, the drive mechanism 120 can be made compact. Further, since the meshed state of the gears in the drive mechanism 120 is not changed when changing the output state, the structure of the second embodiment can increase the lifespan of the drive mechanism 120.

Here, the advantage of using helical gears in the second embodiment is that the helical gears can suppress uneven rotation and, hence, transmit a rotational force more smoothly than spur gears. The disadvantage of helical gears is that they produce a force along the rotational axis that is proportional to the rotational load. If a force along the rotational shaft 21 is generated in the helical gears and applied to the electromagnetic clutch 28 when the electromagnetic clutch 28 is in the separating state, the lifespan of the electromagnetic clutch 28 may be adversely affected.

However, in the drive mechanism 120 having the above construction, a rotational load applied to the carrier 27 is not transmitted to the first input gear 23 via the rotational shaft 21 and planetary gears 26 in a state that the first input gear 23 and carrier 27 are separated. In other words, even though helical gears are used for the drive gear 116 and the second input gear 24a of the two-stage gear 24, a force along the rotational shaft 21 is not generated in the first input gear 23 retained by the electromagnetic clutch 28 due to the rotational load on the carrier 27 when the electromagnetic clutch 28 is in the separating state. Accordingly, the use of helical gears for the first input gear 23 and second input gear 24a of the two-stage gear 24 in the second embodiment can suppress uneven rotations in the gears that will possibly occur when gears are disengaged and re-engaged while the gears are rotating or that will possibly occur due to the properties of the gears themselves, enabling the gears to transmit a drive force more smoothly, without shortening the life of the electromagnetic clutch 28.

In addition, the drive mechanism 120 can be switched between a first output state, second output state, and third output state. In the first output state, in a state that the electromagnetic clutch 28 has been switched to the connecting state, a drive force for rotating the first input gear 23 and second input gear 24a of the two-stage gear 24 in the direction that the ring gear 25 is rotatable is inputted into the first input gear 23 and second input gear 24a, thereby outputting from the carrier 27 a drive force having the same rotating direction and the same speed as the force inputted into the first input gear 23 and second input gear 24a. In the second output state, in a state that the electromagnetic clutch 28 has been switched to the separating state, a drive force for rotating the first input gear 23 and second input gear 24a of the two-stage gear 24 in the direction that the ring gear 25 is rotatable is inputted into the first input gear 23 and second input gear 24a, thereby outputting from the carrier 27 a drive force having the same rotating direction as but a slower speed than the force inputted into the first input gear 23 and second input gear 24a. In the third output state, in a state that the electromagnetic clutch 28 has been switched to the separating state, a drive force for rotating the first input gear 23 and second input gear 24a of the two-stage gear 24 in the direction that the ring gear 25 is not rotatable is inputted into the first input gear 23 and second input gear 24a, thereby halting output from the carrier 27.

With the above configuration, the output state of the drive mechanism 120 is switched to the first output state to drive the driven member with output supplied from the carrier 27 and is switched to the second output state and third output state, respectively, when preliminary driving of the driven member is allowed and when it is unnecessary to drive the driven member. In this way, the drive mechanism 120 can drive the driven member only when necessary so that the life of the driven member can be extended.

Further, in each of the image forming apparatuses 1 and 101 which is provided with: the motor 4 supplying a drive force; the image-forming unit 5 that includes the developing roller 53; and the drive mechanism 20 or 120 which is configured to output the drive force to the developing roller 53. Accordingly, each of the image forming apparatuses 1 and 101 can be configured to reduce the rotational speed of the drive force outputted to the developing roller 53 or can be configured not to output a drive force to the developing roller 53 whenever the developing roller 53 is not supplying toner to the surface of the photosensitive drum 54 for developing an image thereon and, hence, can extend the life of the developing roller 53.

While the description has been made in detail with reference to the specific embodiments thereof, it would be apparent to those skilled in the art that various changes and modifications may be made therein without departing from the spirit and scope of the above described aspects.

For example, in the first embodiment, the drive gear 16 and the input gear 22a engaged with the drive gear 16 are configured as spur gears. However, the drive gear 16 and the input gear 22a may be configured as helical gears, similarly to the second embodiment.

In the first embodiment, three (3) planetary gears 26 are provided in the drive mechanism 20. However, the number of the planetary gears 26 provided in the drive mechanism 20 is not limited to three (3). For example, the drive mechanism 20 may be modified to include only one planetary gear 26. It is sufficient that at least one planetary gear 26 is provided in the drive mechanism 20 for transmitting drive force from the sun gear 22b to the carrier 27 and ring gear 25. Similaraly, in the second embodiment, it is sufficient that at least one planetary gear 26 is provided in the drive mechanism 120.

What is claimed is:

1. A drive mechanism comprising:
   a rotational shaft configured to rotate about a central axis thereof;
   a two-stage gear disposed on the rotational shaft so as to be rotatable about the central axis of the rotational shaft,
      the two-stage gear having an input gear configured to be engaged with a drive gear to receive a drive force from the drive gear,
      the two-stage gear further having a sun gear having outer teeth formed on an outer circumferential surface thereof;
   a ring gear disposed on the rotational shaft so as to be rotatable relative to the two-stage gear about the central axis of the rotational shaft,
      the ring gear having inner teeth formed on an inner circumferential surface thereof;
   a planetary gear disposed between the sun gear of the two-stage gear and the inner teeth of the ring gear and engaged with both of the outer teeth of the sun gear and the inner teeth of the ring gear, the planetary gear having its own rotational axis;
   a carrier disposed on the rotational shaft so as to be capable of rotating together with the rotational shaft about the central axis of the rotational shaft, the carrier being capable of rotating relative to the two-stage gear and the ring gear, the carrier supporting the planetary gear in a state that the planetary gear is capable of rotating about its own rotational axis and movable along a prescribed orbit about the central axis of the rotational shaft, the carrier being configured to output a drive force;
   a drive force transmission switching member disposed coaxially with the rotational shaft and configured to switch between a connecting state connecting the two-stage gear and the carrier such that the two-stage gear and the carrier rotate together via the rotational shaft, and a separating state separating the two-stage gear and carrier such that the two-stage gear and the carrier rotate relative to each other; and
   a one-way clutch disposed coaxially with the rotational shaft and configured to allow the ring gear to rotate in one of a pair of opposite directions about the central axis of the rotational shaft and prohibit the ring gear from rotating in the other one of the pair of opposite directions about the central axis of the rotational shaft.

2. The drive mechanism according to claim 1, wherein the drive mechanism is configured to switch an output state of the drive force among:
   a first output state;
   a second output state; and
   a third output state,
      wherein in the first output state, in a state that the drive force transmission switching member has been switched to the connecting state, a drive force for rotating the two-stage gear in the direction that the ring gear is rotatable is inputted into the input gear of the two-stage gear, thereby outputting from the carrier a drive force having the same rotating direction and the same speed as the force inputted into the input gear of the two-stage gear,
      wherein in the second output state, in a state that the drive force transmission switching member has been switched to the separating state, a drive force for rotating the two-stage gear in the direction that the ring gear is rotatable is inputted into the input gear of the two-stage gear, thereby outputting from the carrier a drive force having the same rotating direction as but a slower speed than the force inputted into the input gear of the two-stage gear, and
      wherein in the third output state, in a state that the drive force transmission switching member has been switched to the separating state, a drive force for rotating the two-stage gear in the direction that the ring gear is not rotatable is inputted into the input gear of the two-stage gear, thereby halting output of the drive force from the carrier.

3. A drive mechanism comprising:
   a rotational shaft configured to rotate about a central axis thereof;
   a first input gear disposed on the rotational shaft so as to be rotatable about the central axis of the rotational shaft and configured to be engaged with a drive gear to receive a drive force from the drive gear, each of the drive gear and the first input gear being a helical gear;
   a two-stage gear disposed on the rotational shaft so as to be rotatable about the central axis of the rotational shaft, the two-stage gear having a second input gear, the second input gear being a helical gear configured to be engaged with the drive gear to receive a drive force from the drive gear, the two-stage gear further having a sun gear having outer teeth formed on an outer circumferential surface thereof;
   a ring gear disposed on the rotational shaft so as to be rotatable relative to the two-stage gear about the central axis of the rotational shaft, the ring gear having inner teeth formed on an inner circumferential surface thereof;
   a planetary gear disposed between the sun gear of the two-stage gear and the inner teeth of the ring gear and engaged with both of the outer teeth of the sun gear and the inner teeth of the ring gear, the planetary gear having its own rotational axis;
   a carrier disposed on the rotational shaft so as to be capable of rotating together with the rotational shaft about the central axis of the rotational shaft, the carrier being capable of rotating relative to the two-stage gear and the ring gear, the carrier supporting the planetary gear in a state that the planetary gear is capable of rotating about its own rotational axis and movable along a prescribed orbit about the central axis of the rotational shaft, the carrier being configured to output a drive force;
   a drive force transmission switching member disposed coaxially with the rotational shaft, and configured to be switchable between a connecting state connecting the first input gear and the carrier such that the first input gear and the carrier rotate together via the rotational shaft, and a separating state separating the first input gear and the carrier such that the first input gear and the carrier can rotate relative to each other; and
   a one-way clutch disposed coaxially with the rotational shaft and configured to allow the ring gear to rotate in one of a pair of opposite directions about the central axis of the rotational shaft and prohibit the ring gear from rotating in the other one of the pair of opposite directions about the central axis of the rotational shaft.

4. The drive mechanism according to claim 3, wherein the drive mechanism is configured to switch an output state of the drive force among:
   a first output state;
   a second output state; and
   a third output state, wherein in the first output state, in a state that the drive force transmission switching member has been switched to the connecting state, a drive force for rotating the first input gear and the second input gear in a direction that the ring gear is rotatable is inputted into the first input gear and the second input gear, thereby outputting from the carrier a drive force having the same rotating direction and the same speed as the force inputted into the first input gear and the second input gear, wherein in the second output state, in a state that the drive force transmission switching member has been switched to the separating state, a drive force for rotating the first input gear and the second input gear in the direction that the ring gear is rotatable is inputted into the first input gear and the second input gear, thereby outputting from the carrier a drive force having the same rotating direction as but a slower speed than the force inputted into the first input gear and the second input gear, and wherein in the third output state, in a state that the drive force transmission switching member has been switched to the separating state, a drive force for rotating the first input gear and the second input gear in the direction that the ring gear is not rotatable is inputted into the first input gear and the second input gear, thereby halting output of the drive force from the carrier.

5. An image forming apparatus comprising:

an image forming section including a developing roller configured to rotate upon receipt of a drive force and supply toner to a surface of a photosensitive drum, thereby developing an electrostatic latent image formed on the surface of the photosensitive drum into a toner image; a drive force source configured to output a drive force;

a drive gear configured to receive the drive force from the drive force source and to output the drive force; and a drive mechanism configured to receive the drive force from the drive gear and to output the drive force to the developing roller, the drive mechanism including:
  a rotational shaft configured to rotate about a central axis thereof;
  a two-stage gear disposed on the rotational shaft so as to be rotatable about the central axis of the rotational shaft, the two-stage gear having an input gear engaged with the drive gear to receive the drive force from the drive gear, the two-stage gear further having a sun gear having outer teeth formed on an outer circumferential surface thereof;
  a ring gear disposed on the rotational shaft so as to be rotatable relative to the two-stage gear about the central axis of the rotational shaft, the ring gear having inner teeth formed on an inner circumferential surface thereof;
  a planetary gear disposed between the sun gear of the two-stage gear and the inner teeth of the ring gear and engaged with both of the outer teeth of the sun gear and the inner teeth of the ring gear, the planetary gear having its own rotational axis;
  a carrier disposed on the rotational shaft so as to be capable of rotating together with the rotational shaft about the central axis of the rotational shaft, the carrier being capable of rotating relative to the two-stage gear and the ring gear, the carrier supporting the planetary gear in a state that the planetary gear is capable of rotating about its own rotational axis and movable along a prescribed orbit about the central axis of the rotational shaft, the carrier being configured to output the drive force to the developing roller;
  a drive force transmission switching member disposed coaxially with the rotational shaft and configured to switch between a connecting state connecting the two-stage gear and the carrier such that the two-stage gear and the carrier rotate together via the rotational shaft, and a separating state separating the two-stage gear and carrier such that the two-stage gear and the carrier rotate relative to each other; and
  a one-way clutch disposed coaxially with the rotational shaft and configured to allow the ring gear to rotate in one of a pair of opposite directions about the central axis of the rotational shaft and prohibit the ring gear from rotating in the other one of the pair of opposite directions about the central axis of the rotational shaft.

6. An image forming apparatus comprising:

an image forming section including a developing roller configured to rotate upon receipt of a drive force and supply toner to a surface of a photosensitive drum, thereby developing an electrostatic latent image formed on the surface of the photosensitive drum into a toner image; a drive force source configured to output a drive force;

a drive gear configured to receive the drive force from the drive force source and to output the drive force; and a drive mechanism configured to receive the drive force from the drive gear and to output the drive force to the developing roller, the drive mechanism including:
  a rotational shaft configured to rotate about a central axis thereof;
  a first input gear disposed on the rotational shaft so as to be rotatable about the central axis of the rotational shaft and engaged with the drive gear to receive the drive force from the drive gear, each of the drive gear and the first input gear being a helical gear;
  a two-stage gear disposed on the rotational shaft so as to be rotatable about the central axis of the rotational shaft, the two-stage gear having a second input gear configured of a helical gear that is engaged with the drive gear to receive the drive force from the drive gear, the two-stage gear further having a sun gear having outer teeth formed on an outer circumferential surface thereof;
  a ring gear disposed on the rotational shaft so as to be rotatable relative to the two-stage gear about the central axis of the rotational shaft, the ring gear having inner teeth formed on an inner circumferential surface thereof;
  a planetary gear disposed between the sun gear of the two-stage gear and the inner teeth of the ring gear and engaged with both of the outer teeth of the sun gear and the inner teeth of the ring gear, the planetary gear having its own rotational axis;
  a carrier disposed on the rotational shaft so as to be capable of rotating together with the rotational shaft about the central axis of the rotational shaft, the carrier being capable of rotating relative to the two-stage gear and the ring gear, the carrier supporting the planetary gear in a state that the planetary gear is capable of rotating about its own rotational axis and movable along a prescribed orbit about the central axis of the rotational shaft, the carrier being configured to output the drive force to the developing roller;

a drive force transmission switching member disposed coaxially with the rotational shaft, and configured to be switchable between a connecting state connecting the first input gear and the carrier such that the first input gear and the carrier rotate together via the rotational shaft, and a separating state separating the first input gear and the carrier such that the first input gear and the carrier can rotate relative to each other; and a one-way clutch disposed coaxially with the rotational shaft and configured to allow the ring gear to rotate in one of a pair of opposite directions about the central axis of the rotational shaft and prohibit the ring gear from rotating in the other one of the pair of opposite directions about the central axis of the rotational shaft.

* * * * *